(12) United States Patent
Ishii

(10) Patent No.: US 12,439,387 B2
(45) Date of Patent: Oct. 7, 2025

(54) SYSTEM AND METHOD FOR COMPUTING RESOURCE MANAGEMENT

(71) Applicant: HITACHI, Ltd., Tokyo (JP)

(72) Inventor: Daisuke Ishii, Santa Clara, CA (US)

(73) Assignee: Hitachi, LTD., Tokyo (JP)

( * ) Notice: Subject to any disclaimer, the term of this patent is extended or adjusted under 35 U.S.C. 154(b) by 357 days.

(21) Appl. No.: 18/137,253

(22) Filed: Apr. 20, 2023

(65) Prior Publication Data

US 2024/0357565 A1 Oct. 24, 2024

(51) Int. Cl.
*H04W 72/0446* (2023.01)
*H04W 72/12* (2023.01)
*H04W 72/23* (2023.01)

(52) U.S. Cl.
CPC ....... *H04W 72/0446* (2013.01); *H04W 72/12* (2013.01); *H04W 72/23* (2023.01)

(58) Field of Classification Search
CPC .. H04W 72/0446; H04W 72/23; H04W 72/12
See application file for complete search history.

(56) References Cited

U.S. PATENT DOCUMENTS

| | | | | |
|---|---|---|---|---|
| 6,006,303 | A * | 12/1999 | Barnaby | G06F 13/18 710/240 |
| 9,843,918 | B2 * | 12/2017 | Luo | H04W 48/10 |
| 11,392,840 | B2 * | 7/2022 | Santhanam | G06Q 30/0631 |
| 2012/0036190 | A1 * | 2/2012 | Samuels | H03M 7/3084 709/204 |
| 2012/0230195 | A1 * | 9/2012 | Khivesara | H04L 47/762 370/235 |
| 2014/0226571 | A1 * | 8/2014 | Das | H04L 47/25 370/329 |
| 2015/0095901 | A1 * | 4/2015 | Cooley | G06F 16/285 717/171 |
| 2015/0195781 | A1 * | 7/2015 | Yi | H04W 52/04 455/452.2 |
| 2017/0075680 | A1 * | 3/2017 | Cooley | G06F 16/285 |
| 2017/0245248 | A1 * | 8/2017 | Lei | H04W 72/542 |
| 2019/0155644 | A1 * | 5/2019 | Aronovich | G06F 9/50 |
| 2020/0367278 | A1 * | 11/2020 | Hosseini | H04L 5/0048 |
| 2020/0403935 | A1 * | 12/2020 | Yerli | G06F 9/5077 |
| 2022/0191916 | A1 * | 6/2022 | Talarico | H04W 72/23 |
| 2022/0329538 | A1 * | 10/2022 | Onishi | H04L 43/0894 |
| 2023/0292257 | A1 * | 9/2023 | Gupta | H04W 52/0254 |
| 2024/0204931 | A1 * | 6/2024 | Xiong | H04L 5/0053 |

* cited by examiner

*Primary Examiner* — Jael M Ulysse
(74) *Attorney, Agent, or Firm* — PROCOPIO, CORY, HARGREAVES & SAVITCH LLP

(57) ABSTRACT

Example implementations described herein involve systems and methods that can involve detecting, from a device schedule indicating a schedule of a plurality of applications used by a plurality of mobile devices in a plurality of locations over a plurality of time slots, whether a bandwidth shortage will occur in each of the plurality of locations; and for detection that a bandwidth shortage will occur at a location in the plurality of locations, calculating a user priority of each of the plurality of applications on each of the plurality of devices at the location based on a bandwidth reduction efficiency and a staying time of the each of the plurality of devices at the location; and determining a bandwidth allocation for each application across the each device at the location and an edge server for managing one or more of the plurality of the applications based on the priority for use.

15 Claims, 21 Drawing Sheets

101 Field Cell Information

| Field Cell ID | Acceptable bandwidth (Mbps) |
|---|---|
| F01 | 250 |
| F02 | 250 |
| F03 | 200 |
| F04 | 300 |
| F05 | 250 |
| F06 | 500 |
| F07 | 500 |
| F08 | 600 |
| F09 | 500 |
| F10 | 550 |
| F11 | 350 |
| F12 | 350 |
| F13 | 300 |
| F14 | 450 |
| F15 | 250 |

FIG. 4

102 Application Information

| Application ID | Application type | Data analysis function | Input data rate | Output data rate | Bandwidth reduction by on-device |
|---|---|---|---|---|---|
| AP01 | Defect detection for part type A | Video data analysis | 35 Mbps | 1 Mbps | 34 Mbps |
| AP02 | Telepresence for line manager B | Data compression | 35 Mbps | 7 Mbps | 28 Mbps |
| AP03 | Predictive maintenance for machine type C | Sensor data analysis | 1 Mbps | 0.5 Mbps | 0.5 Mbps |
| AP04 | Worker state detection for process D | Video data analysis | 60 Mbps | 1 Mbps | 59 Mbps |
| AP05 | Remote maintenance for machine type E | Data compression, video data analysis | 70 Mbps | 7 Mbps | 63 Mbps |
| AP06 | Telepresence for guest F | Data compression | 50 Mbps | 1 Mbps | 49 Mbps |
| AP07 | Defect detection for part type G | Video data analysis | 35 Mbps | 7 Mbps | 28 Mbps |
| AP08 | Predictive maintenance for machine type H | Sensor data analysis | 1 Mbps | 0.5 Mbps | 0.5 Mbps |
| AP09 | Worker state detection for process I | Video data analysis | 35 Mbps | 1 Mbps | 34 Mbps |
| AP10 | Remote maintenance for machine type J | Data compression | 35 Mbps | 7 Mbps | 28 Mbps |

FIG. 5

103 Device Schedule Information

| Time / Device ID | 8:00 am - 9:00 am | 9:00 am - 10:00 am | 10:00 am - 11:00 am | 11:00 am - 12:00 pm | 12:00 pm - 1:00 pm | 1:00 pm - 2:00 pm | 2:00 pm - 3:00 pm | 3:00 pm - 4:00 pm | 4:00 pm - 5:00 pm |
|---|---|---|---|---|---|---|---|---|---|
| D001 | (F01, AP01) | (F02, AP01) | (F03, AP01) | (F08, AP01) | (F09, AP01) | (F14, AP01) | (F15, AP01) | (F10, AP01) | (F05, AP01) |
| D002 | ({F02, F03}, AP02) | ({F02, F03}, AP02) | ({F04, F05}, AP02) | (F03, AP02) | (F02, AP03) | (F05, AP08) | ({F05, F06}, AP02) | ({F05, F06}, AP02) | ({F05, F06}, AP02) |
| D003 | (F03, {AP03, AP04}) | (F03, {AP03, AP04}) | (F03, AP06) | (F03, {AP05, AP06}) | (F03, AP06) | (F07, AP09) | (F03, {AP03, AP04}) | (F03, {AP03, AP04}) | (F03, {AP03, AP04}) |
| D004 | (F07, AP09) | (F08, AP09) | (F09, AP09) | (F09, {AP05, AP08}) | (F10, AP09) | (F08, AP10) | (F07, AP08) | (F07, AP08) | (F08, AP10) |
| D005 | (F05, AP07) | (F01, AP07) | (F02, AP02) | (F03, AP07) | (F08, AP12) | (F04, AP12) | (F09, AP07) | (F09, AP07) | (F10, N/A) |
| D006 | (F06, AP01) | (F01, AP01) | (F02, AP02) | (F03, AP02) | (F08, AP12) | (F07, AP12) | (F00, AP01) | (F00, AP01) | (F10, AP07) |
| D007 | (F18, AP07) | (F13, AP07) | (F08, AP07) | (F03, AP07) | (F03, AP07) | (F09, AP07) | (F15, AP07) | (F15, AP07) | (F15, AP07) |
| D008 | (F03, AP08) | (F03, AP08) | (F03, AP08) | (F03, AP08) | (F03, AP08) | (F03, AP08) | (F03, AP08) | (F03, AP08) | (F03, AP08) |
| D009 | (F12, AP09) | (F12, AP09) | (F12, AP09) | (F12, {AP03, AP09}) | (F12, AP09) | (F12, AP11) | (F12, AP09) | (F12, AP09) | (F12, AP09) |
| D010 | (F15, N/A) | (F15, AP10) | (F14, AP11) | (F12, AP11) | (F13, AP11) | (F13, AP11) | (F12, AP11) | (F12, AP11) | (F11, N/A) |

104 Application Operation Plan

| Device ID | Maximum number of on-device applications | On-server application list | On-device application list | Available number of on-device applications |
|---|---|---|---|---|
| D001 | 2 | AP01 | n/a | 2 |
| D002 | 2 | AP02 | AP03, AP08 | 0 |
| D003 | 2 | AP03, AP04 | n/a | 2 |
| D004 | 2 | AP07, AP08, AP09, AP10 | n/a | 2 |
| D005 | 2 | AP07, AP10, AP12 | n/a | 2 |
| D006 | 2 | AP01, AP02, AP10, AP12 | n/a | 2 |
| D007 | 2 | AP07 | n/a | 2 |
| D008 | 2 | AP08 | n/a | 2 |
| D009 | 2 | AP09 | AP03 | 1 |
| D010 | 2 | AP10, AP11 | n/a | 2 |

FIG. 9

$$tbw\_reduce(A) = \sum_{k=0}^{D\_num} bw\_reduce * flag(D_k, A)$$

$$P(A) = \sum_{k=0}^{D\_num} bw\_reduce * flag(D_k, A) * W(T\_stay(D_k, A))$$

tbw_reduce(AP02)
= 25 × flag(D002, AP02)
+ 25 × flag(D006, AP02)
= 25 × 0 + 25 × 1 = 25 Mbps P(AP02)
= 25 × flag(D002, AP02) × W(T_stay(D002, AP02))
+ 25 × flag(D006, AP02) × W(T_stay(D006, AP02))
= 25 × 0 × 0.1 + 25 × 1 × 0.3 = <u>7.5</u> tbw_reduce(AP05)
= 63 × flag(D003, AP05)
= 63 × 1 = 63 Mbps

P(AP05)
= 63 × flag(D002, AP02) × W(T_stay(D003, AP05))
= 63 × 1 × 0.1 = <u>6.3</u> tbw_reduce(AP06)
= 49 × flag(D003, AP06)
= 49 × 1 = 49 Mbps

P(AP06)
= 49 × flag(D003, AP06) × W(T_stay(D003, AP06))
= 49 × 1 × 0.3 = <u>14.7</u> tbw_reduce(AP07)
= 28 × flag(D005, AP07)
+ 28 × flag(D007, AP07)
= 28 × 1 + 28 × 1 = 56 Mbps P(AP07)
= 28 × flag(D005, AP07) × W(T_stay(D005, AP07))
+ 28 × flag(D007, AP07) × W(T_stay(D007, AP07))
= 28 × 1 × 0.1 + 28 × 1 × 0.2 = <u>8.4</u> tbw_reduce(AP08)
= 0.5 × flag(D008, AP08)
= 0.5 × 1 = 0.5 Mbps

P(AP08)
= 0.5 × flag(D008, AP08) × W(T_stay(D008, AP08))
= 0.5 × 1 × 9 = <u>4.5</u>

FIG. 16

Application Operation Plan Output

Device View — 1401

| Device ID | Time 8:00 am - 9:00 am | 9:00 am - 10:00 am | 10:00 am - 11:00 am | 11:00 am - 12:00 pm | ... |
|---|---|---|---|---|---|
| D001 | (F01, AP01) | (F02, AP01) | (F03, AP01) | (F08, AP01) | ... |
| D002 | ({F02, F03}, AP02) | | ({F04, F05}, AP02) | | ... |
| D003 | | ({F02, F03}, AP02) | | | ... |
| ... | | | | | |

Field Cell View — 1402

| Field Cell | | Time 8:00 am - 9:00 am | 9:00 am - 10:00 am | 10:00 am - 11:00 am | ... |
|---|---|---|---|---|---|
| F01 | Device List | (D001, AP01) | (D005, AP07), (D006, AP01) | None | ... |
| | Bandwidth Usage | 35 Mbps | 70 Mbps | Mbps | ... |
| F02 | Device List | (D002, AP02) | (D001, AP01), (D002, AP02) | (D005, AP07), (D006, AP02) | ... |
| | Bandwidth Usage | 35 Mbps | 36 Mbps | 70 Mbps | ... |
| F03 | Device List | (D003, {AP03, AP04}), (D008, AP08) | (D003, {AP03, AP04}), (D002, AP02) | (D001, AP01), (D008, AP08) | ... |
| | Bandwidth Usage | 38 Mbps | 72 Mbps | 36 Mbps | ... |
| ... | | | | | |

FIG. 19

SYSTEM AND METHOD FOR COMPUTING RESOURCE MANAGEMENT

BACKGROUND

Field

The present disclosure relates generally to computing resource management systems, and more specifically, to distributing applications to devices and an edge sever in consideration of computing resources and wireless network bandwidth utilization.

Related Art

The spread of digital technologies such as artificial intelligence (AI). Internet of Things (IoT), and 5G inspires the digital transformation of manufacturing. The utilization of robotics technology and data analytics technology with AI and IoT contributes to advanced manufacturing automation.

The progress of the wireless technology such as 5G can introduce more flexible workspace solutions. One example is the remote maintenance solution with a telepresence robot. A user can control the telepresence robot in the manufacturing line remotely. Then, the user can check the status of assets or the manufacturing line with the high-resolution video data provided by the camera of the telepresence robot.

Another example is a flexible manufacturing line where the components of the manufacturing line can be easily moved. According to the type of the products, the structure of the manufacturing can be designed flexibly. Such systems improve productivity for mass customization.

In related art implementations, there can be systems and methods for enabling software engine virtualization and dynamic resource and task distribution across two kinds of components which can include an edge-side component and a cloud-side component.

SUMMARY

The related art implementations do not consider the mobility of components, the dynamic change of software to use, and the difference of network characteristic due to locations. Further, to ensure the performance for these new solutions, it can be important to operate computing resources and network resources in the manufacturing system according to the change of the manufacturing line environment.

Example implementations described herein provide for the stable operation by the computing resource management by considering the mobility of components, the change of applications, and the difference of network characteristic due to locations. By considering the mobility of several components, the change of applications, and the difference of network characteristic due to locations, example implementations described herein can allocate applications across devices and an edge server so that the wireless network bandwidth utilization of devices does not exceed the acceptable bandwidth for each location.

The example implementations described herein manage the schedule of multiple mobile devices, which includes the locations of the devices and the application used by the devices for each time slot. The system confirms whether the bandwidth shortage will occur in each location based on the schedule information.

To solve the bandwidth shortage, the system calculates the priority for using the application on the device by considering the bandwidth reduction efficiency and the staying time duration of the device in each location. Based on the priority, the system decides the allocation of each application across the devices and the edge server.

Aspects of the present disclosure can involve a method, which can involve detecting, from a device schedule indicating a schedule of a plurality of applications used by a plurality of mobile devices in a plurality of locations over a plurality of time slots, whether a bandwidth shortage will occur in each of the plurality of locations; for a detection that a bandwidth shortage will occur at a location in the plurality of locations, calculating a priority for use of each of the plurality of applications on each of the plurality of devices at the location based on a bandwidth reduction efficiency and a staying time of the each of the plurality of devices at the location; and determining a bandwidth allocation for the each of the plurality of the applications across the each of the plurality of devices at the location and an edge server for managing one or more of the plurality of the applications based on the priority for use.

Aspects of the present disclosure can involve a computer program, which can involve instructions including detecting, from a device schedule indicating a schedule of a plurality of applications used by a plurality of mobile devices in a plurality of locations over a plurality of time slots, whether a bandwidth shortage will occur in each of the plurality of locations; for a detection that a bandwidth shortage will occur at a location in the plurality of locations, calculating a priority for use of each of the plurality of applications on each of the plurality of devices at the location based on a bandwidth reduction efficiency and a staying time of the each of the plurality of devices at the location; and determining a bandwidth allocation for the each of the plurality of the applications across the each of the plurality of devices at the location and an edge server for managing one or more of the plurality of the applications based on the priority for use. The computer program and instructions can be stored on a non-transitory computer readable medium and executed by one or more processors.

Aspects of the present disclosure can involve a system, which can involve means for detecting, from a device schedule indicating a schedule of a plurality of applications used by a plurality of mobile devices in a plurality of locations over a plurality of time slots, whether a bandwidth shortage will occur in each of the plurality of locations; for a detection that a bandwidth shortage will occur at a location in the plurality of locations, means for calculating a priority for use of each of the plurality of applications on each of the plurality of devices at the location based on a bandwidth reduction efficiency and a staying time of the each of the plurality of devices at the location; and means for determining a bandwidth allocation for the each of the plurality of the applications across the each of the plurality of devices at the location and an edge server for managing one or more of the plurality of the applications based on the priority for use.

Aspects of the present disclosure can involve an apparatus, which can include a processor, configured to detect, from a device schedule indicating a schedule of a plurality of applications used by a plurality of mobile devices in a plurality of locations over a plurality of time slots, whether a bandwidth shortage will occur in each of the plurality of locations; and for a detection that a bandwidth shortage will occur at a location in the plurality of locations, calculate a priority for use of each of the plurality of applications on each of the plurality of devices at the location based on a bandwidth reduction efficiency and a staying time of the each of the plurality of devices at the location; and determine a bandwidth allocation for the each of the plurality of the applications across the each of the plurality of devices at the location and an edge server for managing one or more of the plurality of the applications based on the priority for use.

BRIEF DESCRIPTION OF DRAWINGS

FIG. 4 is an example of the Field Cell Information, in accordance with an example implementation.

FIG. 5 is an example of the Application Information, in accordance with an example implementation.

FIG. 6 is an example of the Device Schedule Information, in accordance with an example implementation.

FIG. 8 is an example of the state of device congestion, in accordance with an example implementation.

FIG. 9 is an example of the Application Operation Plan, in accordance with an example implementation.

FIG. 16 is an example of the priority calculation, in accordance with an example implementation.

FIG. 19 is an example of Application Operation Plan Output GUI, in accordance with an example implementation.

DETAILED DESCRIPTION

Figure 1:
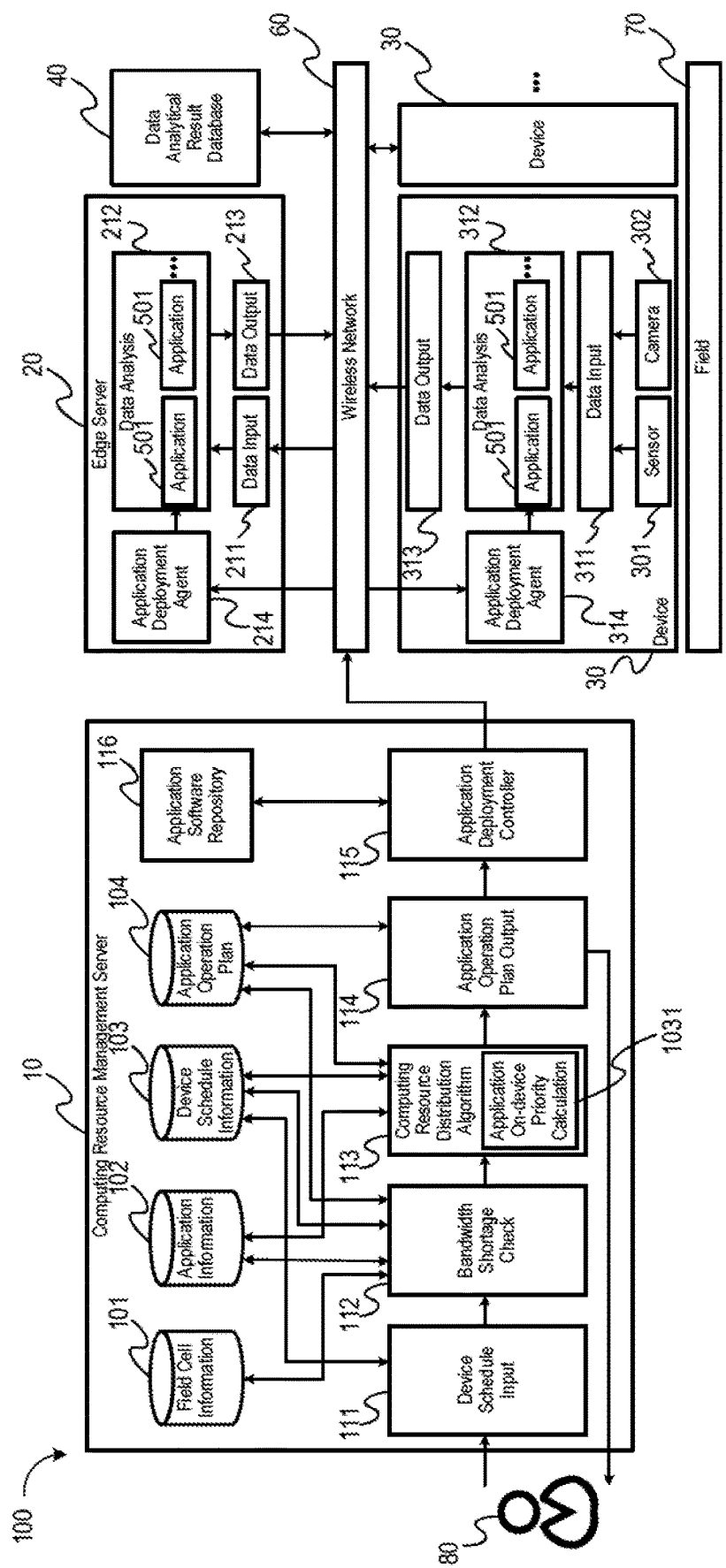
FIG. 1 is a generalized illustration of a computing resource management system that can be used to implement the system and the method of example implementations described herein.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The computing resource management system for mobile devices using data analytical applications in a factory is described herein in accordance with an example implementation. It assumed that in the factory, several kinds of applications are used, such as but not limited to the worker status detection with the analytics of the video data in the manufacturing line, the part failure detection with the analytics of the image date of the part produced in the manufacturing line, and the remote maintenance application using a telepresence robot.

FIG. 1 is a generalized illustration of a computing resource management system 1 that can be used to implement the system and the method of example implementations described herein.

The computing resource management system 1 can involve a computing resource management server 10, an edge server 20, devices 30, and a data analytical result database 40. These components are connected via the wireless network 60.

The computing management server 10 manages the deployment and execution of data analytical applications. The computing resource management server 10 can involve the field cell information 101, the application information 102, the device schedule information 103, and the application operation plan 104 as data. Further, the computing resource management server 10 can involve the device schedule input 111, the bandwidth shortage check 112, the computing resource distribution algorithm 113, the application operation plan output 114, and the deployment controller server 115 as functions. The details of these data and functions are explained below.

The edge server 20 is a computing environment for data analytical applications. The edge server 20 can involve the data input 211, the data analysis 212, the data output 213, and the deployment controller client 214 as functions. The data input 211 provides an interface to communicate with the devices 30, gets the data from the devices 30, and forwards the data to the data analysis 212. The data analysis 212 executes the applications 501 for analyzing the data from the data input 211 and forwards the analytical results to the data output 213. The data output 213 sends the analytical results to the data analytical result database 40. The deployment controller agent 214 receives the command from the application deployment controller 115 on the computing resource management server 10, and executes the deployment of applications 501 on the data analysis 212.

In this example, it is assumed that the edge server 20 has large computing resources to cover all applications at the same time.

The example in FIG. 1 illustrates a single edge server 20, however, the present disclosure is not limited thereto, and the computing resource management system can accommodate two or more edge servers depending on the desired implementation.

The device 30 is a component to collect data with sensing devices such as, but not limited to, a camera and a sensor, and to use data analytical applications. In this example, the device 30 is a mobile component such as, but not limited to, a telepresence robot, a robotic arm with wheels, an automated guided vehicle, and an autonomous mobile robot.

The device 30 can involve the sensor 301, the camera 302, the data input 311, the data analysis 312, and the data output 313, and the application deployment agent 314. The sensor 301 monitors some kinds of environmental information such as, but not limited to, temperature, vibration, and sound. Further, the sensor 301 sends the data to the data input 311.

Similarly, the camera 302 captures the field environment as image data, such as, but not limited to, video streaming data, photo data, and 3D data. Then, the camera 302 sends the image data to the data input 311.

The data input 311 gets the data from the sensor 301 or the camera 302, and forwards the data to the data analysis 312. The data analysis 312 executes the application 501 for analyzing the data from the data input 311 and forwards the analytical results to the data output 313. The data output 313 sends the analytical results to the data analytical result database 40.

The deployment controller agent 314 receives the command from the application deployment controller 115 on the computing resource management server 10, and executes the deployment of applications 501 on the data analysis 312.

Generally, the computing resources on devices are limited. Therefore, in this example, it is assumed that the device 30 can execute only a few applications simultaneously.

The data analytical result database 40 stores the data analytical results from the edge server 20 and the devices 30. In this example, the data analytical result database 40 is separated from other components, but is not limited thereto, and other components can involve the data analytical result database 40. For example, the computing resource management server 10 can involve the data analytical result database 40. Further, the edge server 20 can involve the data analytical result database 40.

Figure 2A:
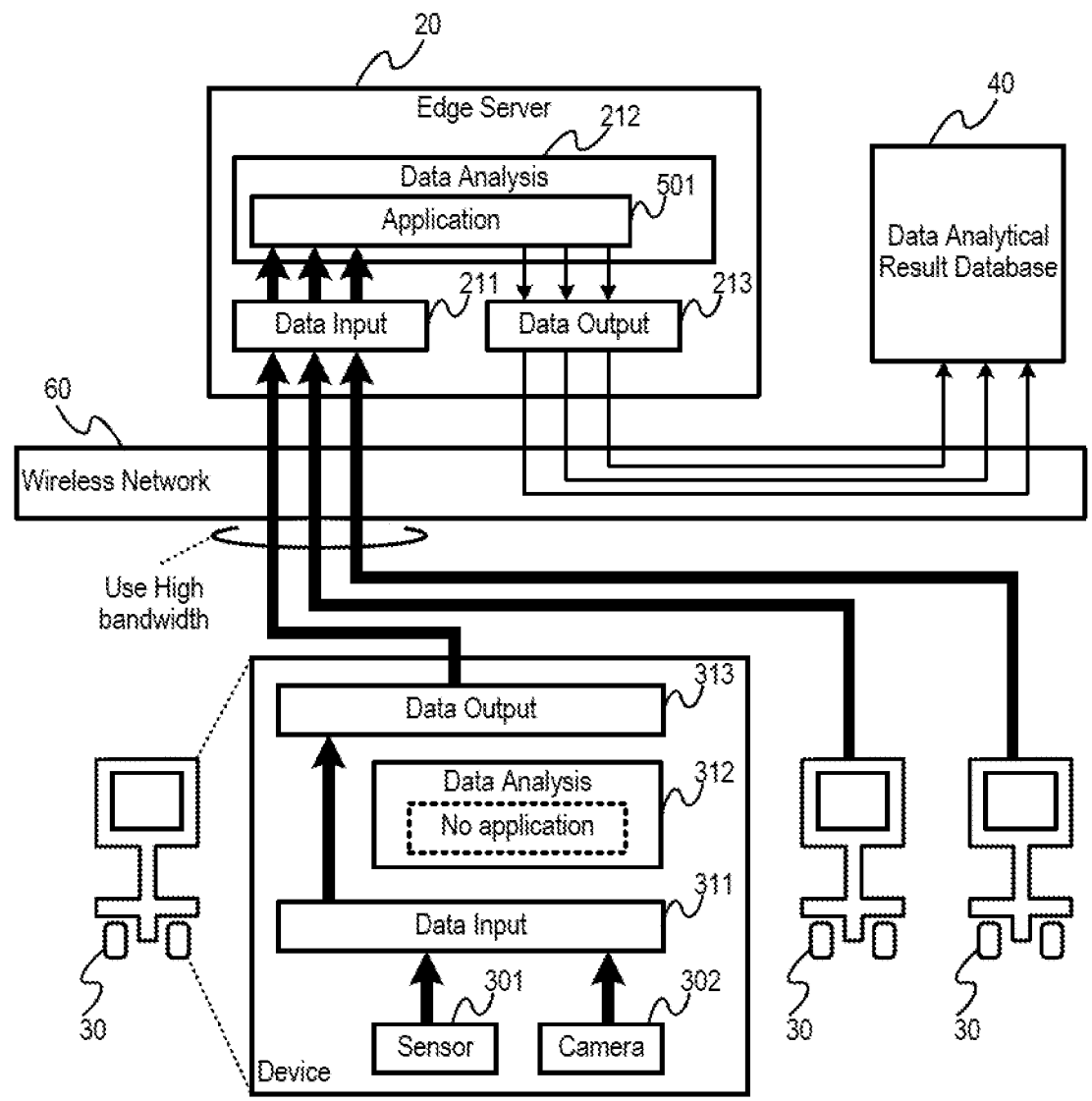
FIGS. 2A and 2B illustrate the application execution methods, in accordance with an example implementation.
Figure 2B:
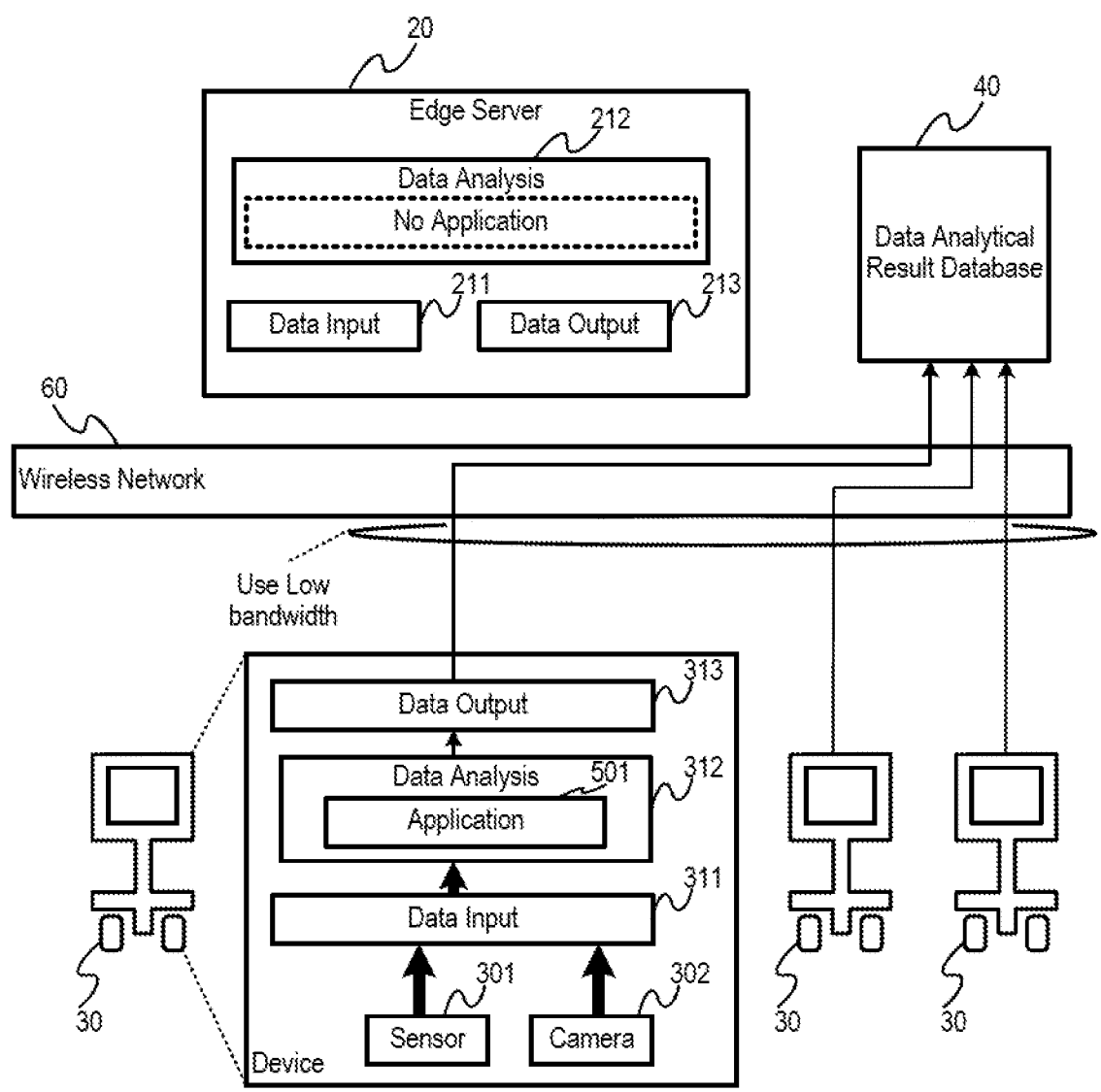

Example implementations described herein involve two methods to execute applications 501, which are on-server method and on-device method. FIGS. 2A and 2B illustrate the application execution methods, in accordance with an example implementation. One is the on-server method shown in FIG. 2A. In an on-server method, the edge server 20 executes applications 501 on the data analysis 212. The device 30 sends input data, which the data input 311 receives from the sensor 301 and the camera 302, to the edge server 20 without data analysis processing. The advantage for the on-server method is that the computing resource management system 1 can save computing resources on devices. However, a disadvantage is that the bandwidth utilization in the wireless network is high because each device sends the data of the sensor 301 and the camera 302 without data analysis processing.

Another method is the on-device method shown in FIG. 2B. In the on-device method, the device 30 executes applications 501 on the data analysis 312, and the device 30 sends output data, which is the results of data analysis processing for the input data form the sensor 301 and the camera 302, to the data analytical result database 40. The advantage of the on-device method is that the computing resource management system 1 can save bandwidth utilization in the wireless network 60 because the data analytical results are exchanges in the wireless network. The disadvantage is that on-device method uses more computing resources on devices compared to on-server method. Therefore, there is a trade-off between on-server method and on-device method.

The example implementations described herein considers this trade-off and calculates an application execution plan with the combination of the on-server method and the on-device method. The basic idea is to use on-server method for as many applications 501 as possible. If there is a potential of bandwidth shortage in the wireless network 60, the on-device is used for some of the applications 501 to solve the bandwidth shortage with less computing resource usage on devices 30.

Figure 3:
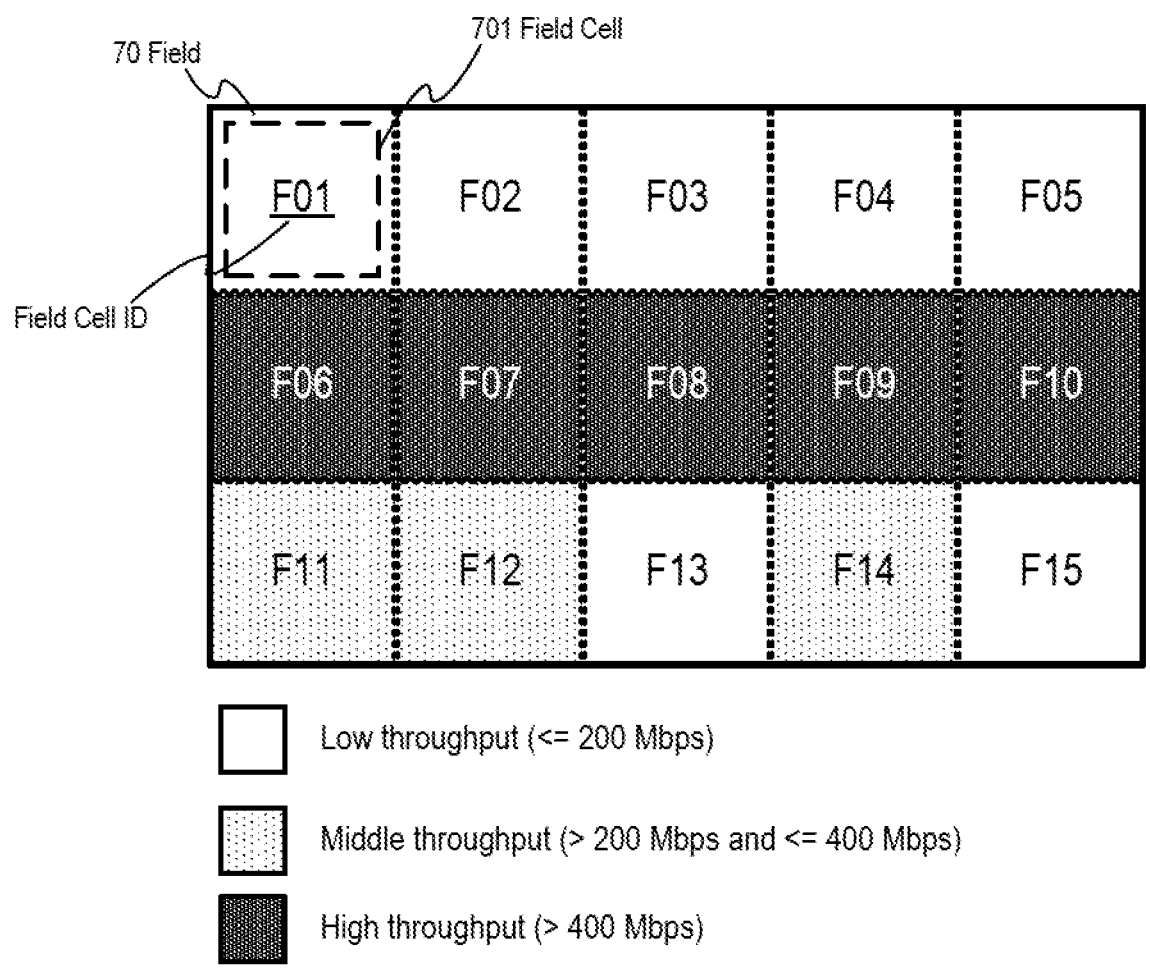
FIG. 3 is an illustration of the Field Cell, in accordance with an example implementation.

The field cell information 101 stores the acceptance throughput of the field cell 701. FIG. 3 illustrates an example of the field cell 701, in accordance with an example implementation. In this example, the field 70 is a manufacturing line area. The field 70 is separated into fifteen field cells 701. Each field cell 701 has the field cell ID that is an identify for each the field cell 701.

Each field cell 701 has different wireless network throughput characteristics which depends on the layout of the manufacturing line and the position of wireless network antenna.

In this example, it is assumed that the bandwidth characteristic of each field cell 701 is independent from the one of other field cells 701 due to the wireless technologies such as micro cell technology that uses a dedicated base station for each field cell 701, and space division multiple access technology that ensure the network characteristic independence for each field cell with a directional antenna. So, for example, the bandwidth utilization of F01 does not affect other Field Cell bandwidth utilization.

FIG. 4 illustrates an example of the field cell information 101, in accordance with an example implementation. In this example, the field cell information 101 includes two columns which are the field cell IDs and the acceptable bandwidth information. For example, the acceptable bandwidth for field cell ID FOI is 250 Mbps, which indicates that if the total communication throughput of devices in the field cell FOI is under 250 Mbps, then the communication of each device is stable. However, if the total communication throughput is over 250 Mbps, the communication becomes unstable and causes application error due to data loss, delay, delay jitter, and so on. In the manufacturing line, it is important to provide stable communication to ensure product quality and safety.

The application information 102 manages the list of applications 501 used in the computing resource management system 1, and stores the information of required bandwidth for each application 501.

FIG. 5 illustrates an example of the application information 102, in accordance with an example implementation. In this example, the application information 102 includes six columns which are the application ID, the application type, the data analysis function, the input data bandwidth rate, the output data bandwidth rate, and the bandwidth reduction by on-device method.

The application ID is the identifier of Application 501 and the key for this table. The application type indicates the name of application. This example considers a manufacturing line as Field 70, and the application type includes some applications to improve productivity such as defect detection of parts, predictive maintenance for industrial machines, worker state detection, and so on. This example further considers remote collaborative application such as remote maintenance for workers and telepresence application for manager visits and virtual tours for guests. The data analysis function column indicates the kind of data analytical processing that is mainly used in the application. For example, AP01, which is the defect detection, uses the video data analysis, and AP03, which is the predictive maintenance, uses the sensor data analysis. The input data rate indicates the required bandwidth for the input data from sensors and cameras. The output data rate indicates the required bandwidth for the output data after data analytics processing.

The bandwidth reduction by on-device indicates how much the computing resource management system 1 can save the bandwidth utilization by changing the application execution method from on-sever method to on-device method at one device. This value is calculated by subtracting the output data rate from the input data rate.

The device schedule information 103 manages the location of devices and applications to use in devices. FIG. 6 illustrates an example of the device schedule information 103, in accordance with an example implementation. In this example, it is assumed that, for each day, the device schedule information 103 is created. FIG. 6 shows the information of a certain day. The hours during 8:00 am to 5:00 pm are considered as working time in the manufacturing line, and the hours are divided into nine time slots for each hour.

In this example, the device schedule information 103 stores a location and an executing application for each device in each time slot. The location and the executing application are expressed by ({Field ID sets}, {Application ID sets}). For example, in FIG. 6, the device D001's information in time slot from 8:00 am to 9:00 am is (F01, AP01). This indicates that the device D001 uses application AP01 in the field cell F01 during this time slot.

In other examples, the device D002's information in time slot from 8:00 am to 9:00 am is ({F02, F03}, AP02). It means that the device D002 using application AP02 moves in two field cells F02 and F03. The device D003's information in time slot from 8:00 am to 9:00 am is (F03, {AP03, AP04}). It means that the device D003 uses the applications AP03 and AP04 in the field cell F03 simultaneously.

In this example, the interval of the time slot is one hour, but the present disclosure is not limited thereto and the example implementations described herein can facilitate the change of the interval of the time slot flexibly. For example, the time slot interval can be set to 10 minutes, 1 minutes, and so on in accordance with the desired implementation. For example, such adjustments can depend on the speed of the mobile device and the frequency of the location change or the application change.

Figure 7:
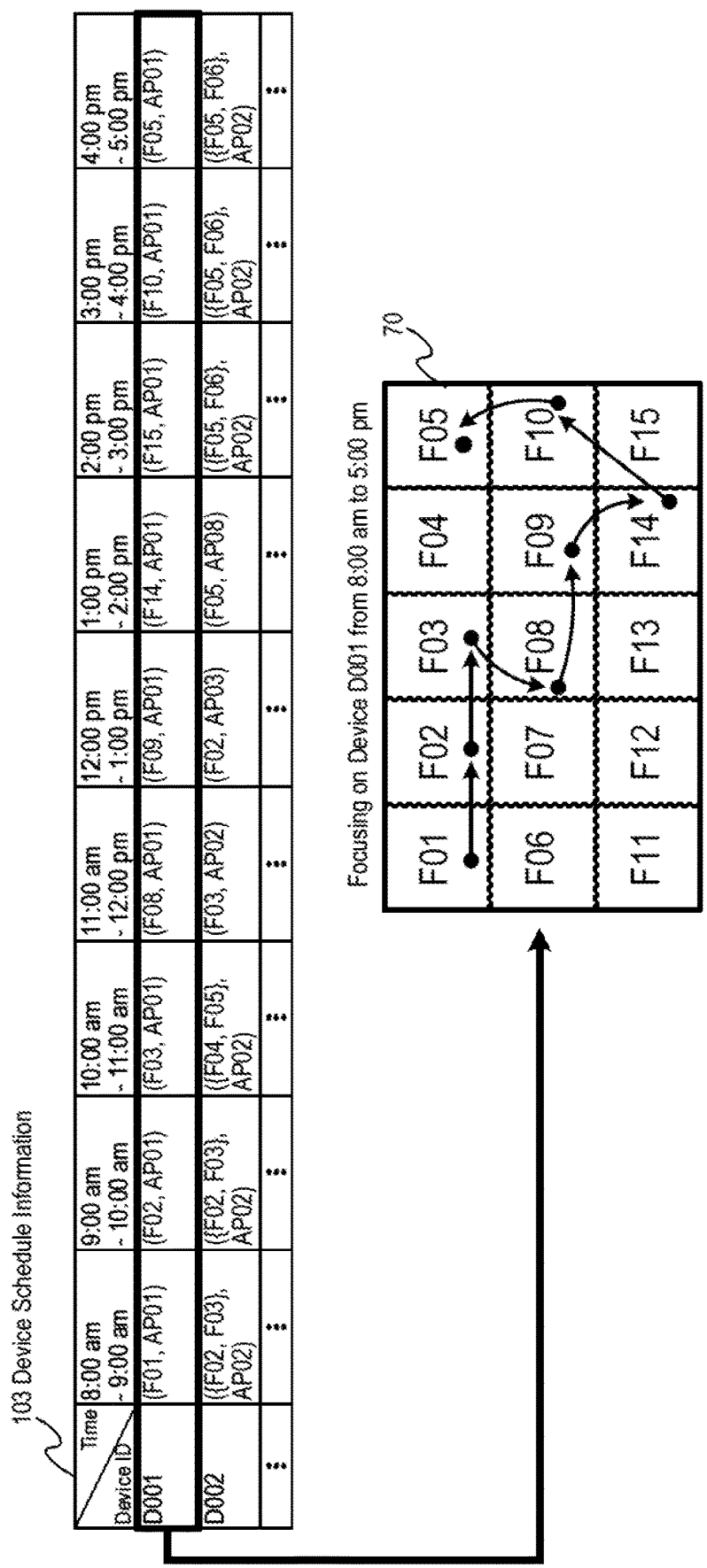
FIG. 7 is an example of the route of the device, in accordance with an example implementation.

By focusing on each device in the device schedule information 103, the route of the device can be found. FIG. 7 illustrates an example of the device route, in accordance with an example implementation. FIG. 7 focuses on the device D001, and it is found that the device D001 moves in order by F01. F02, F03, FOS, F09, F14, F15, F10, and F05.

Figure 8:
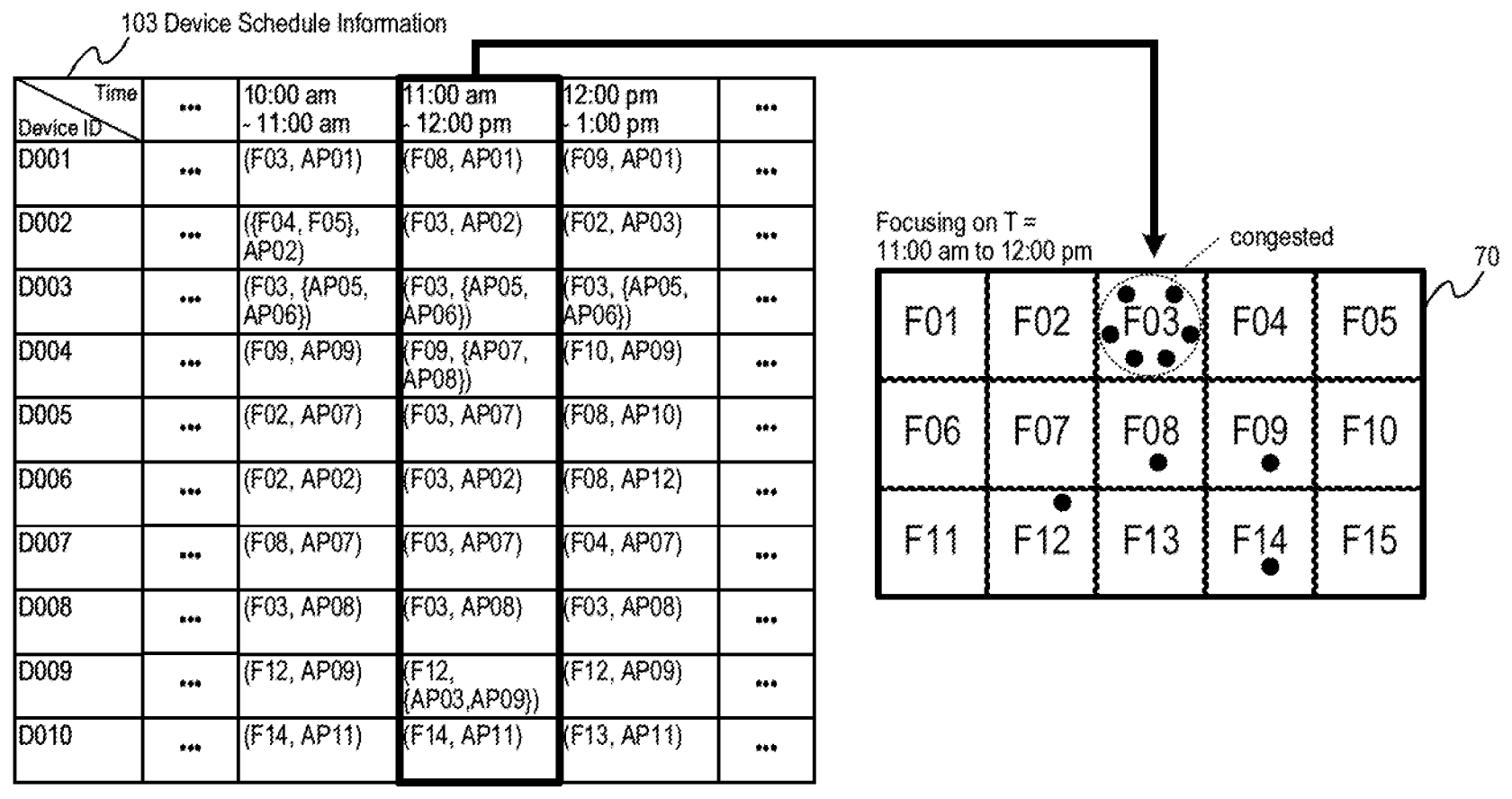

Further, by focusing on the time slot, the state of device congestion in each field cell. FIG. 8 illustrates an example of the state of device congestion, which focuses on time slot 11:00 am-12:00 pm. It is found that six devices concentrate on the field cell F03 and it may cause bandwidth shortage in the wireless network.

The application operation plan 104 manages which application is used on each device, which application execution method is used, and how much computing resource in each device is available.

FIG. 9 illustrates an example of the application operation plan 104, in accordance with an example implementation. The application operation plan 104 includes five columns which are the device ID, the maximum number of on-device applications, on-server application list, on-device application list, the available number of on-device applications.

The maximum number of on-device applications indicates how many applications a device can execute with on-device method simultaneously. The on-server application list indicates the list of applications 501 that are scheduled to work with on-server method. On-device application list indicates the list of applications 501 that are scheduled to work with on-device method. Available number of on-device applications indicates how many applications can be added to the on-device application list, which is calculated by subtracting the output data rate from the input data rate.

In this example, it is assumed that the device schedule and the application operation plan for each day are fixed on the previous day. However, the present disclosure is not limited thereto, and the plan can change during the day in accordance with the desired implementation. For example, there can be several plans for one day. For example, three plans can be used for 8:00 am-11:00 am, 11:00 am-2:00 pm, and 2:00 pm-5:00 μm.

Here, functions for computing resource management are described. The device schedule input 111 is the function to input device locations and using applications in each time slot to the device schedule information 103. The device schedule input 111 provides interfaces like Graphic User Interfaces (GUIs), Command Line Interfaces (CLIs), and Application Programming Interfaces (APIs) to the user 80.

The bandwidth shortage check 112 is the function to confirm whether bandwidth shortage in the wireless network occurs or not. The bandwidth shortage check 112 calculates the difference between the total of required bandwidth and the acceptable bandwidth by using the field cell information 101, the application information 102, the device schedule information 103, and the application operation plan 104. If the bandwidth shortage check 112 finds a potential bandwidth shortage, the bandwidth shortage check 112 asks the computing resource distribution algorithm 113 to calculate an application distribution plan for solving the bandwidth shortage.

The computing resource distribution algorithm 113 decides how to distribute applications to the edge server 20 and the device 30 by using the application information 102, the device schedule information 103, and the application operation plan 104. Based on the calculation results, the computing resource distribution 104 modifies the device schedule information 103 and the application operation plan 104 to solve the bandwidth shortage. To judge which application should be executed on the device 30 in consideration of the trade-off shown in FIG. 5, the computing resource distribution 104 includes the application on-device priority calculation 1031 which prioritizes applications to use with on-device method.

The application operation plan output 114 outputs the data of the application operation plan 104 to deploy applications on the edge server 20 and the device 20. Further, the application operation plan output 114 shows the data of application operation plan 104 to the user 80 via some kinds of interfaces like GUIs. CLIs, and APIs.

The application deployment controller 115 deploys applications 501 on the edge server 20 and the device 30. The application deployment controller 115 gets application software from the application software repository 116. Then, the application deployment controller 115 sends the desired application software to the application deployment agent 201 on the edge server 201 or the application deployment agent 301 on the device 30, and sends commands to launch the application.

The application software repository 116 stores software of applications 501 listed in the application information 102.

Examples of application software are an execution file with the installer, a script file, a container, and so on.

Figure 10:
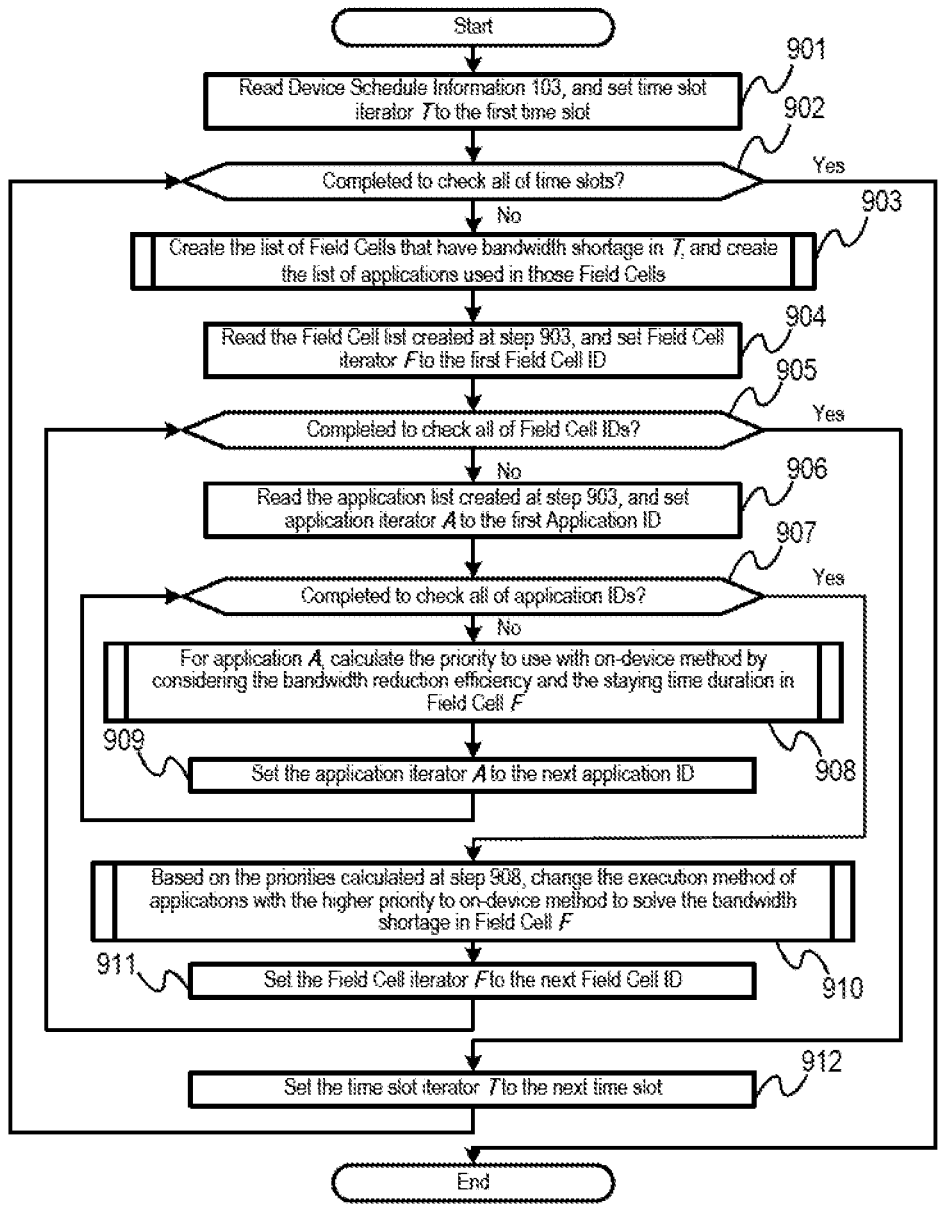
FIG. 10 is a flowchart of the operations of the computing resource distribution, in accordance with an example implementation.

Then, the processes of the computing resource distribution in the example implementations herein are executed. FIG. 10 illustrates a flow chart of the operation of the computing resource distribution, in accordance with an example implementation.

Firstly, the bandwidth shortage check 112 reads the device schedule information 103, and set the time slot iterator T to the first time slot at step 901.

Then, at step 902, the bandwidth shortage check 112 confirms whether it completed to check the bandwidth status for all of time slots or not. If yes, the operation of the computing resource distribution is finished. If no, then at step 903, the bandwidth shortage check 112 creates the list of the field cells that have bandwidth shortage in T, and creates the list of applications used in those field cells.

Next, the computing resource distribution algorithm 113 reads the field cell list created at step 903, and sets the field cell iterator F to the first field cell ID at step 904.

Next, at step 905, the computing resource distribution algorithm 113 confirms whether it completed to check the bandwidth status for all of field cells in the list created at step 903 or not. If yes, the bandwidth shortage check 112 sets the time slot iterator T to the next time slot in the device schedule information 103 at step 912, and goes back to step 902.

If no, then at step 906, the computing resource distribution algorithm 113 reads the application list created at step 903, and sets application iterator A to the first Application ID.

Next, at step 907, the computing resource distribution algorithm 113 confirms whether it completed to check the information for all of application IDs in the list created at step 903.

If no, at step 908, for application 4, the application on-boarding priority calculation 1031 calculates the priority to use with on-device method by considering the bandwidth reduction efficiency and the staying time duration in the field cell F. Then, at step 909, the computing resource distribution algorithm 113 sets the application iterator A to the next application ID in the list created at step 903, and goes back to step 907.

If yes, at step 910, based on the priorities calculated at step 908, the computing resource distribution algorithm 113 changes the execution method of applications with the higher priority to on-device method to solve the bandwidth shortage in the field cell F. Then, the computing resource distribution algorithm 113 sets the field cell iterator F to the next field cell ID in the list created at step 903 at step 911, and goes back to step 905.

Figure 11:
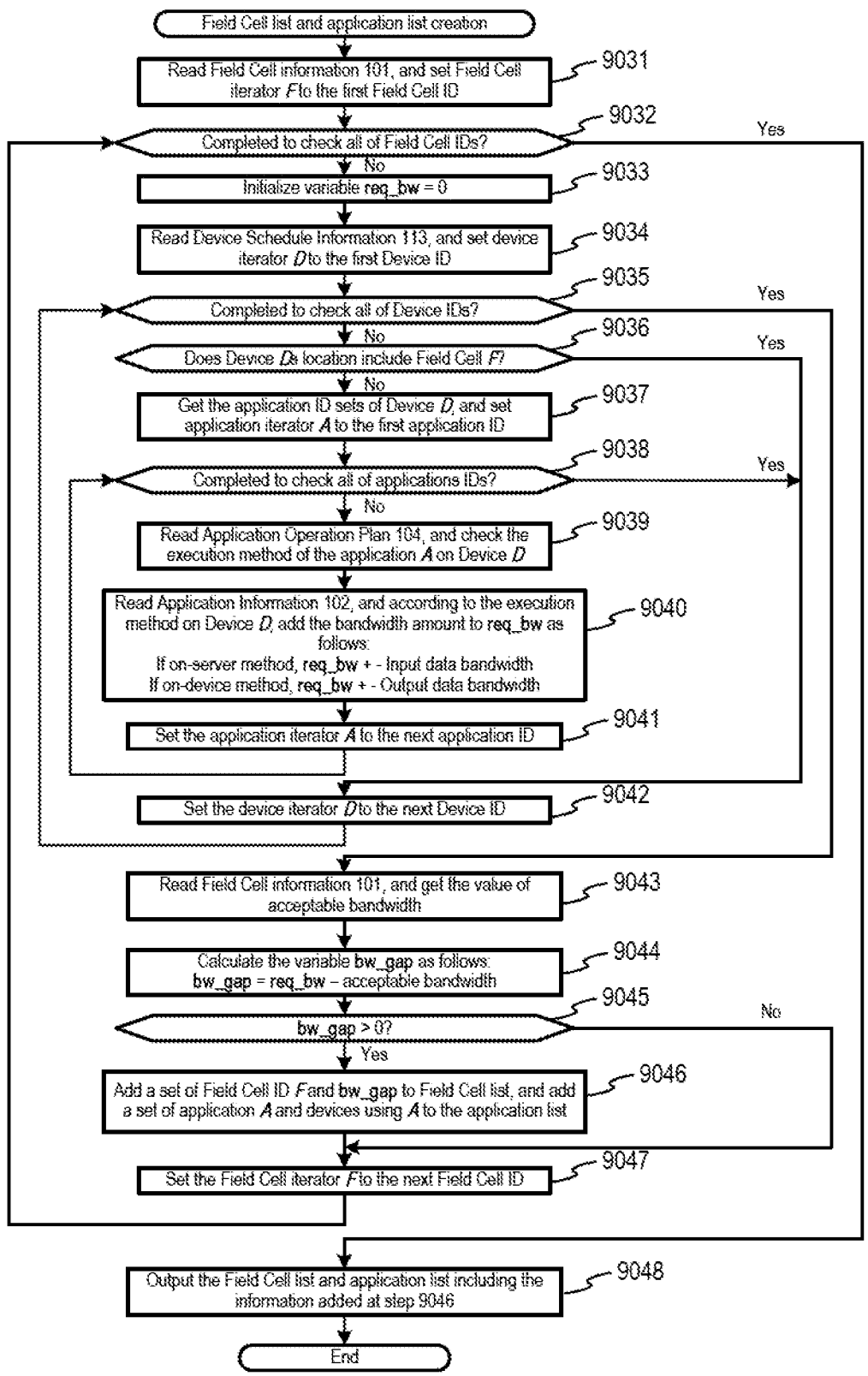
FIG. 11 is a flowchart of the creation of Field Cell list and the application, in accordance with an example implementation.

FIG. 11 illustrates a flow chart of the creation of the field cell list and the application list related to bandwidth shortage at step 903, in accordance with an example implementation.

Firstly, at step 9031, the bandwidth shortage check 112 reads the field cell information 101, and sets the field cell pointer F to the first field cell ID.

Next, at step 9032, the bandwidth shortage check 112 confirms whether it completed to check the information for all of field cells or not. If yes, at step 9048, the bandwidth shortage check 112 outputs the field cell list and the application list including the information added at step 9046, and finishes the creation of the field cell list and the application list related to bandwidth shortage.

If no, at step 9033, the bandwidth shortage check 112 initializes the variable req_bw that indicates the required bandwidth in the target field cell ID. In this initialization, req_bw is set to zero.

Next, at step 9034, the bandwidth shortage check 112 reads the device schedule information 113, and sets the device pointer D to the first device ID.

Next, at step 9035, the bandwidth shortage check 112 confirms whether it checked the information for all of devices or not. If yes, the bandwidth shortage check 112 moves to step 9043.

If no, at step 9036, the bandwidth shortage check 112 confirms whether the device D's location includes the field cell F or not. If yes, at step 9042, the bandwidth shortage check 112 sets the device iterator D to the next device ID in the device schedule information 113, and goes back to step 9035.

If no, at step 9037, Bandwidth Shortage Check 112 gets the application ID sets of the device D, and set the application iterator A to the first application ID.

Then, at step 9038, the bandwidth shortage check 112 confirms whether it checked the information for all of applications 501 in the information that it can gets at step 9037, or not. If yes, at step 9042, the bandwidth shortage check 112 sets the device iterator D to the next device ID in the device schedule information 113, and goes back to step 9035.

If no, at step 9039, the bandwidth shortage check 112 reads the application operation plan 104, and checks the execution method of the application A on Device D.

Next, at step 9040, the bandwidth shortage check 112 reads the application information 102, and according to the execution method on the device D, adds the bandwidth amount to req_bw as follows:

If on-server method, req_bw += Input data bandwidth
If on-device method, req_bw += Output data bandwidth Then, at step 9041, the bandwidth shortage check 112 sets the application iterator 4 to the next application ID, and goes back to step 9038.

After checking all of the device IDs at step 9035, at step 9043, the bandwidth shortage check 112 reads the field cell information 101, and gets the value of acceptable bandwidth.

Next, Bandwidth Shortage Check 112 calculates the variable bw_gap as follows:

bw_gap=req_bw−acceptable bandwidth

Then, at step 9045, the bandwidth shortage check 112 confirms whether the value of bw_gap is bigger than zero. If yes, at step 9046, the bandwidth shortage check 112 adds a set of the field cell ID F and bw_gap to the field cell list, and adds a set of application A and devices using 4 to the application list. After that, at step 9047, the bandwidth shortage check 112 sets the field cell iterator F to the next field cell ID in the field cell information 101, and goes back to step 9032.

If no, by skipping step 9045, the bandwidth shortage check 112 sets the field cell iterator F to the next field cell ID in the field cell information 101, and goes back to step 9032.

After checking all of the field cell IDs at step 9032, at step 9048, the bandwidth shortage check 112 outputs the Field Cell list and the application list including the information added at step 9046, and finishes the creation of the field cell list and the application list related to bandwidth shortage.

Figure 12:
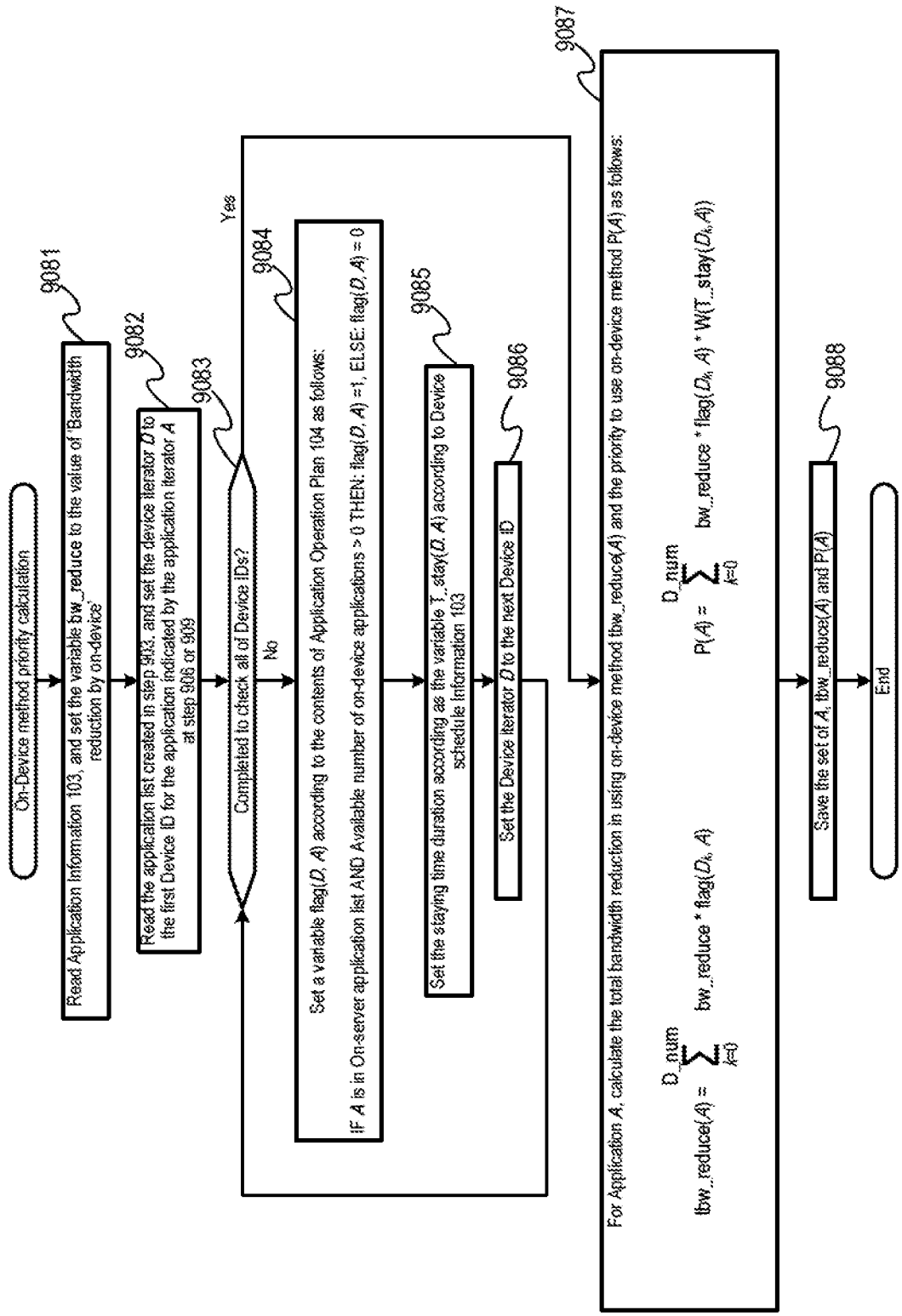
FIG. 12 is a flowchart of the creation of the calculation of the priority to use on-device method, in accordance with an example implementation.

FIG. 12 illustrates a flow chart of the calculation of the priority to use on-device method for the application at step 908, in accordance with an example implementation.

Firstly, at step 9081, the on-device priority calculation 1031 reads the application information 103, and sets the variable bw_reduce to the value of 'Bandwidth reduction by on-device'.

Next, at step 9082, the on-device priority calculation 1031 reads the application list created in step 903, and sets the device iterator D to the first device ID for the application indicated by the application iterator A at step 906 or 909.

Then, at step 9083, the on-device priority calculation 1031 confirms whether it completed to check all of the device IDs or not. If yes, the on-device priority calculation 1031 confirms goes to step 9087.

If no, at step 9084, the on-device priority calculation 1031 sets a variable flag (D, A) according to the contents of the application operation plan 104 as follows:

IF A is in the on-server application list AND the available number of on-device applications >0 THEN:

$$\text{flag}(D, A) = 1$$
$$\text{ELSE: flag}(D, A) = 0$$

Next, at step 9085, the on-device priority calculation 1031 sets the staying time duration according as the variable T_stay (D, A) according to the device schedule Information 103.

Then, at step 9086, the on-device priority calculation 1031 sets the device iterator D to the next device ID, and goes back to step 9083.

After checking all of the device IDs at step 9083, at step 9087, the on-device priority calculation 1031 calculates the total bandwidth reduction in using on-device method tbw_reduce (A) and the priority to use on-device method P(A) as follows:

$$\text{tbw\_reduce}(A) = \sum_{k=0}^{D\_num} \text{bw\_reduce} * \text{flag}(D_k, A)$$

$$P(A) = \sum_{k=0}^{D\_num} \text{bw\_reduce} * \text{flag}(D_k, A) * W(T\_\text{stay}(D_k, A))$$

In these equations, $D_k$ is the same iterator as step 9082, and D_num is the number of devices for the application indicated by the application iterator A at step 906 or 909.

Finally, at step 9088, the on-device priority calculation 1031 saves the set of A, tbw_reduce(A) and P(A).

Figure 13:
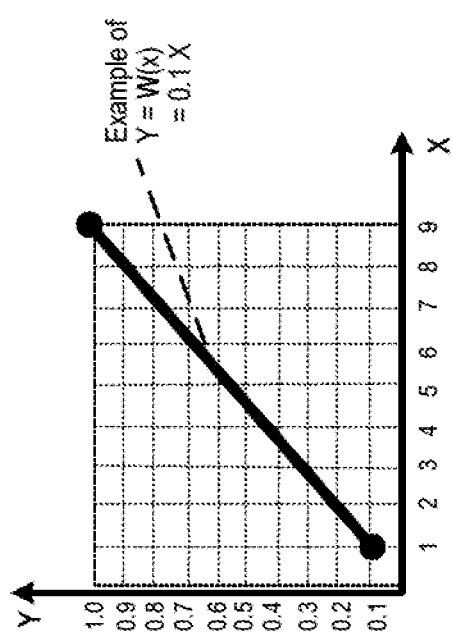
FIG. 13 is an example of the weight function W(x), in accordance with an example implementation.

FIG. 13 illustrates an example of the weight function W(x), in accordance with an example implementation. In FIG. 13, W(x) is described as 0.1*x, where x is the number of time slots when the device stays continuously in a certain field cell.

Here, the policy for the weight function definition in this example is explained. The applications of the devices staying in the same field cell for a long time are used with on-device method. It is because these devices have big impact on that field cell.

The applications of devices moving to another field cell in a short time are used with on-server method. It is because the impact of these devices is temporary. The computing resources of these devices would be used to solve bandwidth shortage in other field cells.

FIG. 13 is one example. The administrator of the computing resource management system 1 can define W(x) flexibly.

If the algorithm cannot solve the bandwidth shortage due to the shortage of computing resources, the field manager reconsiders the device schedule or increase bandwidth by adding the base station, use other networks except the current wireless network, and so on.

Figure 14:
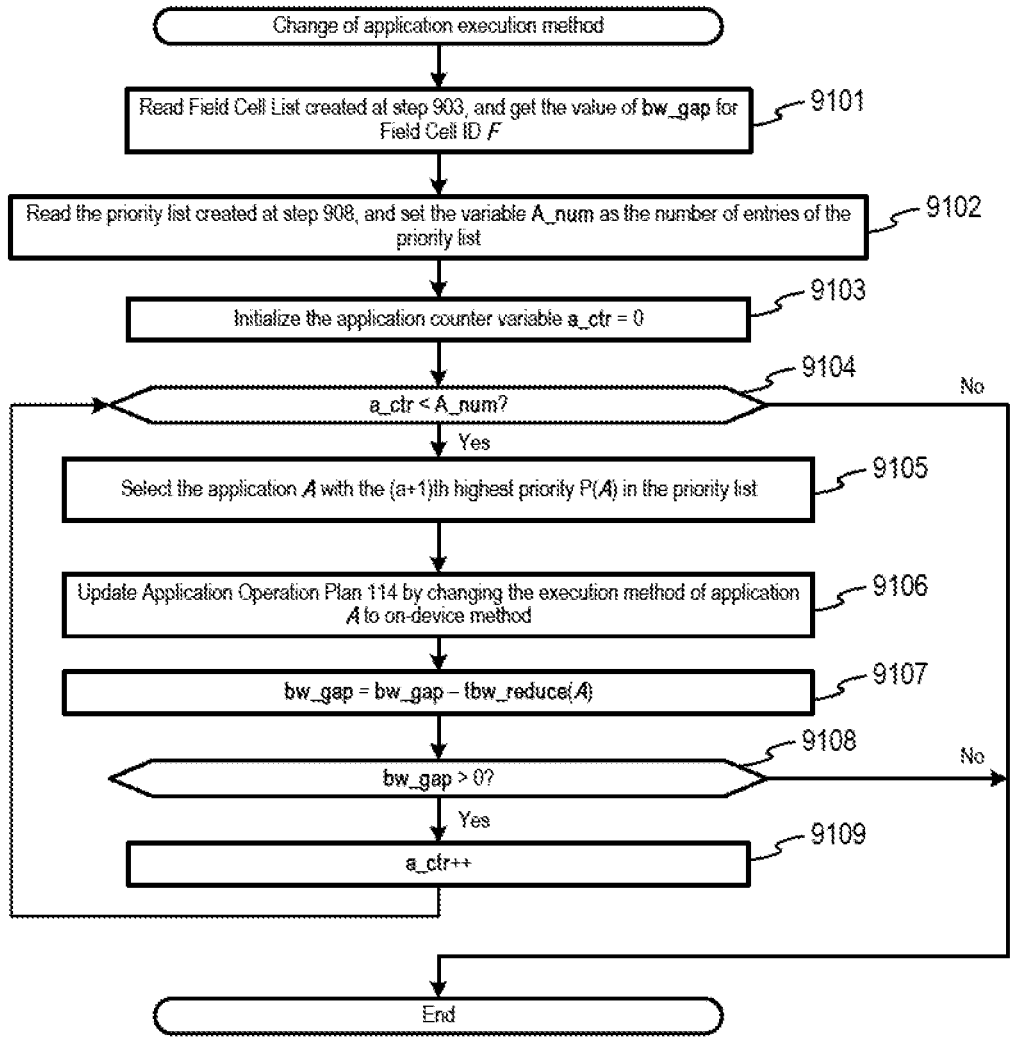
FIG. 14 is a flowchart of the change of the application execution method, in accordance with an example implementation.

FIG. 14 illustrates a flowchart of the change of application execution method at step 910, in accordance with an example implementation.

Firstly, at step 9101, the application on-boarding priority calculation 1031 reads the field cell list created at step 903, and gets the value of bw_gap for the field cell ID F.

Next, at step 9102, the application on-boarding priority calculation 1031 reads the priority list created at step 908, and sets the variable A_num as the number of entries of the priority list.

Next, at step 9103, the application on-boarding priority calculation 1031 initializes the application counter variable a_ctr that indicates the required bandwidth in the target field cell ID. In this initialization, a_ctr is set to zero.

Then, at step 9104, the application on-boarding priority calculation 1031 confirms whether the value of a_ctr is less than that of A_num. If no, the application on-boarding priority calculation 1031 finishes the process shown in this flowchart.

If yes, at step 9105, the application on-boarding priority calculation 1031 selects the application A with the (a+1)th highest priority in the priority list created at step 908.

Next, at step 9106, the application on-boarding priority calculation 1031 updates the application operation plan 114 by changing the execution method of application A to on-device method. At that time, if the application A cannot be used with on-device mode in a certain device because of the available numbers of on-device applications, the value of tbw_reduce (4) is reduced. For examples, one application A' is used in the devices D01 and D02, and tbw_reduce (A') is 10 Mbps. However, if the device D01 cannot use any more application with on-device method, tbw_reduce (A') is reduced from 10 Mbps to 5 Mbps.

Next, at step 9107, with the value tbw_reduce (4) for the application. A selected at step 9105, the application on-boarding priority calculation 1031 updates the value of bw_gap as follows.

Then, at step 9108, the application on-boarding priority calculation 1031 confirms whether the value of bw_gap is bigger than zero. If no, the application on-boarding priority calculation 1031 finishes the process shown in this flowchart.

If yes, at step 9109, the application on-boarding priority calculation 1031 increments a_ctr. Then, the application on-boarding priority calculation 1031 goes back to step 9104.

After checking all of applications at step 9104 or solving the bandwidth gap between the required bandwidth and the acceptable bandwidth at step 9106, the application on-boarding priority calculation 1031 finishes the process shown in this flowchart.

In this example, there is a possibility that the bandwidth gap cannot be solved even if all applications are used with on-device method. At that time, another process is executed. For example, the cancel or reschedule, the increase of computing resources for devices 30, and the increase of network resources like adding new wireless base stations are considered. These processes are not included in the present invention, but, they can be included in the flowchart shown in FIG. 10, FIG. 11, FIG. 12, and FIG. 13.

Figure 15:
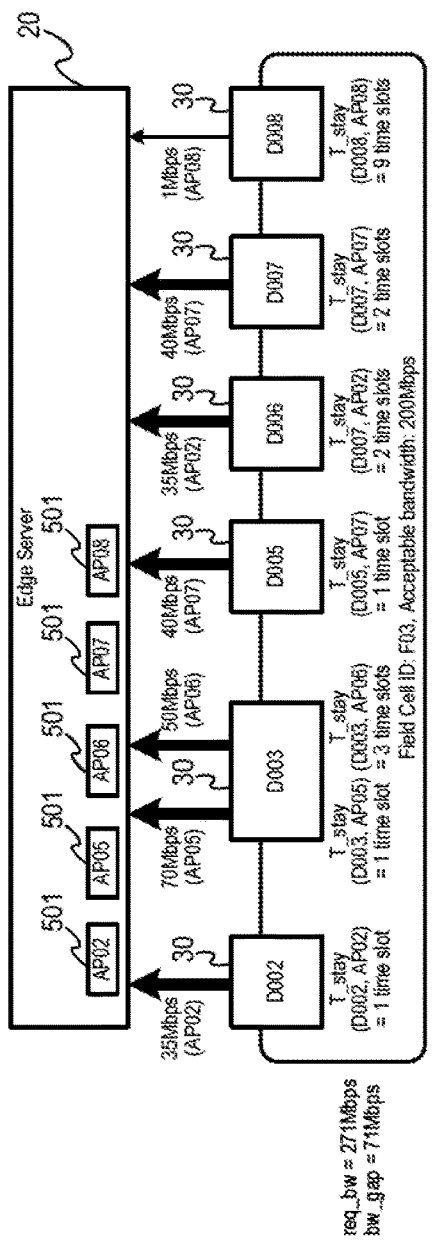
FIG. 15 is an example of the situation of bandwidth shortage.

Here, one example of the priority calculation is explained. FIG. 15 illustrates an example of the situation of bandwidth shortage. FIG. 15 shows the situation of bandwidth shortage in the field cell ID F03 on the time slot 11:00 am-12:00 am which can be found from the device schedule information 103 in FIG. 6.

In this situation, five applications AP02, AP05, AP06, AP07 and AP08 are included in the list created at step 9046 in FIG. 11. Also, six devices D002, D003, D005, D006, D007, and D008 uses the applications in the field Cell ID F03 in this time slot. When all of six devices use the applications with on-server method, the total required bandwidth req_bw is 271 Mbps, and then, the bandwidth of 71 Mbps, which is equal to the value of bw_gap. Only the device D002 has no availability to use AP02 with on-device method because the device D002's computing resources is used for other applications which will be used in other situations.

FIG. 16 illustrates the priority calculation for the situation shown in FIG. 15, in accordance with an example implementation. For five applications AP02. AP05, AP06, AP07, and AP08, the bandwidth reduction efficiency tbw_reduce (A) and the priority P(A) are calculated.

For example, the application AP02 is used in the devices D002 and D006, the bandwidth reduction by on-device is 28 Mbps, and 28 Mbps is set as the value of bw_reduce at step 9081 in FIG. 12. By the procedure of step 9084, flag (D002, AP02) is set to zero because D002's available number of on-device applications is zero. And, flag (D006, AP02) is set to one because D006 is in on-server application list and D006's available number of on-device applications is more than zero. The value of tbw_reduce (AP02) is calculated as 25*0+25*1=25 Mbps.

Similarly, the calculation results of tbw_reduce (AP05), tbw_reduce (AP06), tbw_reduce (AP07) and tbw_reduce (AP08) are 63 Mbps, 49 Mbps, 56 Mbps, and 0.5 Mbps, respectively.

Further, from the device schedule information 103, it is found that T_stay (D002. AP02) is 1 time slot during 11:00 am-12:00 am and T_stay (D006, AP02) is 3 time slots during 10:00 am-1:00 pm. So, by the weight function W(x)=0.1*x shown in FIG. 13, the values of W(T_stay (D002, AP02)) and W(T_stay (D006, AP02) are 0.1 and 0.3 respectively. And then, P (AP02) is calculated as 25*0×0.1+ 25*1*0.3=7.5.

Similarly, the calculation results of P (AP05), P (AP06), P (AP07) and P (AP08) are 6.3, 14.7, 8.4, and 4.5.

Based on the calculation results, with the process for the change of the application execution method in FIGS. 14, AP06 and AP07 are selected as applications with on-device method to solve the bandwidth shortage bw_gap=71 Mbps. It is because AP06 has the highest priority and AP07 has the second highest priority.

Figure 17:
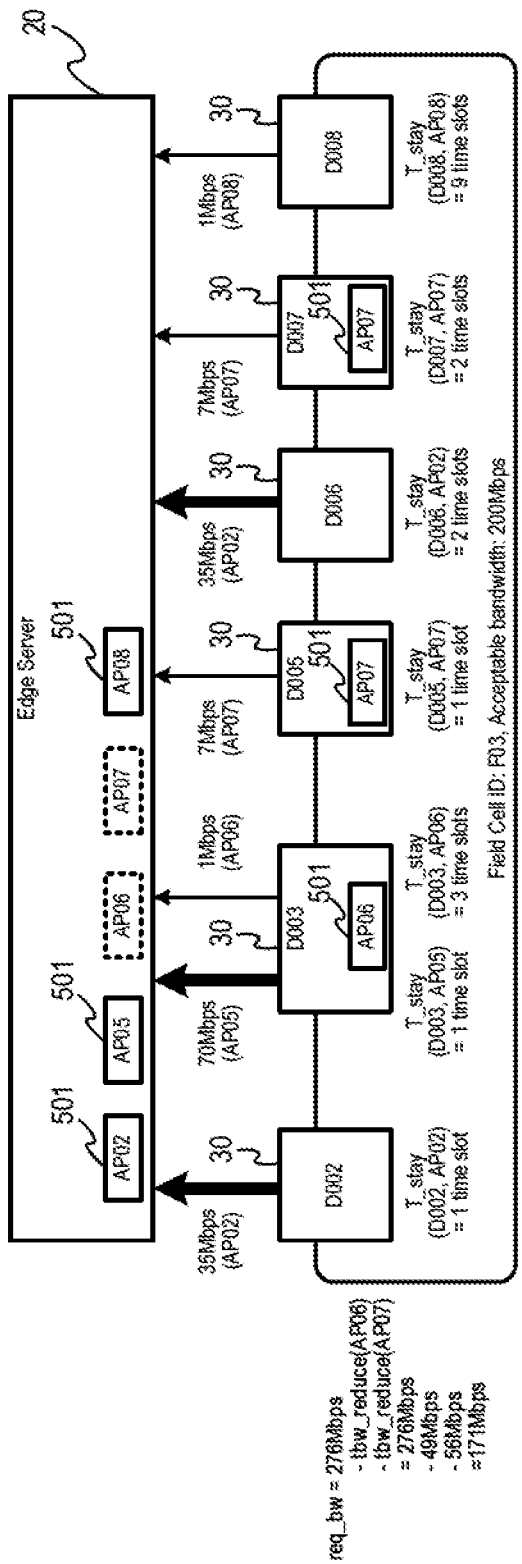
FIG. 17 is an illustration of the situation after the change of the application execution method.

FIG. 17 illustrates the situation after the application execution method is changed based on the priority calculation results shown in FIG. 16. AP06 is executed on the devices D003 and AP07 is executed on the devices D005 and D007. The required bandwidth is reduced to 171 Mbps.

If only the bandwidth reduction efficiency is considered, the applications AP05 and AP07 are changed to on-device method without considering the fluidity of devices and the continuousness of bandwidth reduction on the target field cell. On the other hand, the introducing algorithm considers these aspects and selects the applications AP06 and AP07.

Figure 18:
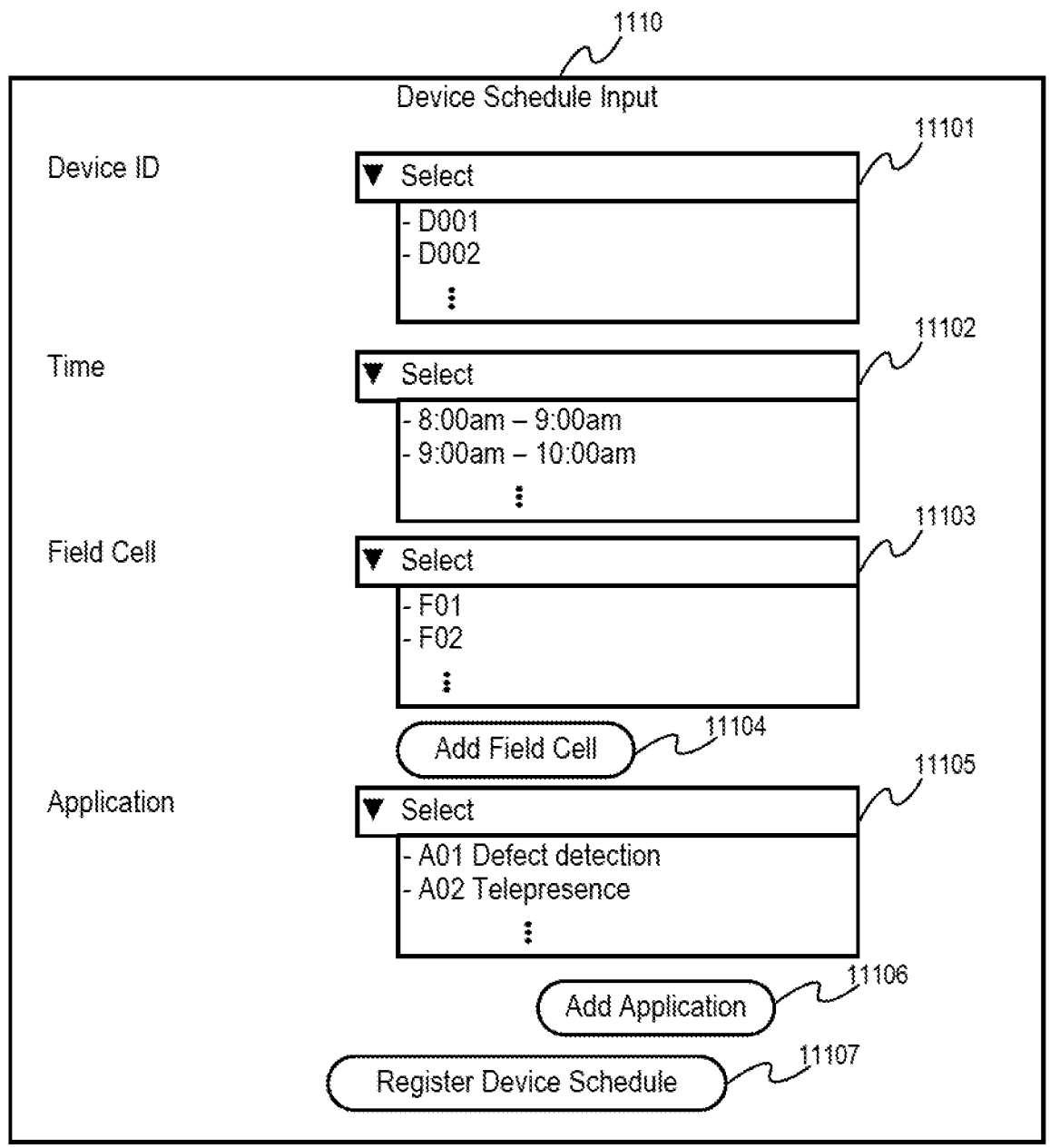
FIG. 18 is an example of the Device Schedule Input GUI, in accordance with an example implementation.

Next, the examples of GUI are introduced. FIG. 18 illustrates an example of the device schedule input GUI, in accordance with an example implementation. The device schedule input GUI 1110 has four input forms, which are the device ID input form 11101, the time slot input form 11102, the field cell input form 11103, the application input form 11105.

The device ID input form 11101 provides the device list and the user 80 can select the target device. The time slot input form 11102 provides the time slot list and the user 80 can select the time slot when the target device works.

The field cell input form 11103 provides the field cell list and the user 80 can select the field cell ID where the target device works. If the target device moves to several field cells during the same time slot, the user 80 can add another field cell by clicking "Add Field Cell" button 11104.

The application input form 11105 provides the application list and the user 80 can select the application that the target device uses during the time slot selected at the time slot input form 11102. If the target device uses several applications during the same time slot, the user 80 can add another application by clicking "Add Application" button 11105.

By clicking "Register Device Schedule" button 11107, the user 80 can register the information selected on the device schedule input GUI 1110 into the device schedule information 103.

FIG. 18 illustrates an example of the application operation plan output GUI, in accordance with an example implementation. The application operation plan output GUI 1140 displays several kinds of information tables. FIG. 19 is an example of Application Operation Plan Output GUI, in accordance with an example implementation. In FIG. 18 and FIG. 19, two types of tables are introduced. One is the device view 11401 and another is the field cell view 11402.

The device view 11401 focuses on the schedule of each device' and shows the data of device schedule information 103 visually. The field cell view 11402 focuses on the situation for each field cell. The field cell view 11402 displays the device list of each field cell and bandwidth usage information.

Like these examples shown in FIG. 18 and FIG. 19, the user 80 can input the information required by the computing resource management and confirm the situation of bandwidth utilization in each field cell.

Through the example implementations described herein, the execution position (e.g., on the device or on the edge server) can be adjusted automatically to save the computing resources on devices as much as possible and to satisfy the constraint for the acceptance bandwidth in the wireless network.

Figure 20:
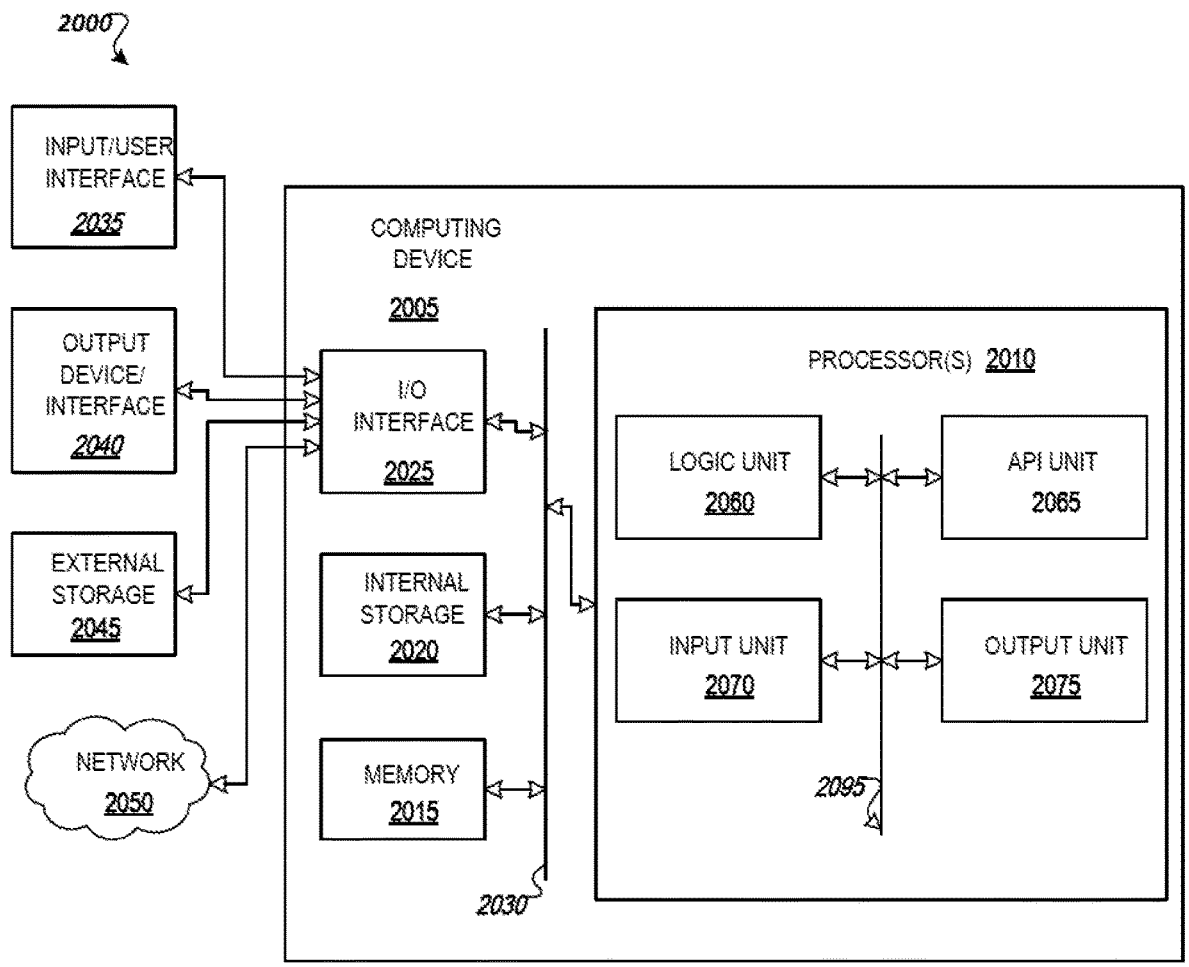
FIG. 20 illustrates an example computing environment with an example computer device suitable for use in some example implementations.

FIG. 20 illustrates an example computing environment with an example computer device suitable for use in some example implementations, such as a computing resource management server 10 of FIG. 1 configured to facilitate the example implementations described herein. Computer device 2005 in computing environment 2000 can include one or more processing units, cores, or processors 2010, memory 2015 (e.g., RAM, ROM, and/or the like), internal storage 2020 (e.g., magnetic, optical, solid-state storage, and/or organic), and/or IO interface 2025, any of which can be coupled on a communication mechanism or bus 2030 for communicating information or embedded in the computer device 2005. IO interface 2025 is also configured to receive images from cameras or provide images to projectors or displays, depending on the desired implementation.

Computer device 2005 can be communicatively coupled to input/user interface 2035 and output device/interface 2040. Either one or both of the input/user interface 2035 and output device/interface 2040 can be a wired or wireless interface and can be detachable. Input/user interface 2035 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 2040 may include a display, television, monitor, printer, speaker, braille, or the like. In some example implementations, input/user interface 2035 and output device/interface 2040 can be embedded with or physically coupled to the computer device 2005. In other example implementations, other computer devices may function as or provide the functions of input/user interface 2035 and output device/interface 2040 for a computer device 2005.

Examples of computer device 2005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2005 can be communicatively coupled (e.g., via IO interface 2025) to external storage 2045 and network 2050 for communicating with any number of networked components, devices, and systems, including one or more computer devices of the same or different configuration. Computer device 2005 or any connected computer device can be functioning as, providing services of, or referred to as a server, client, thin server, general machine, special-purpose machine, or another label.

IO interface 2025 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 2000. Network 2050 can be any network or combination of networks (e.g., the Internet, local area network, wide area network, a telephonic network, a cellular network, satellite network, and the like).

Computer device 2005 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 2005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl. JavaScript, and others).

Processor(s) 2010 can execute under any operating system (OS) (not shown), in a native or virtual environment.

One or more applications can be deployed that include logic unit 2060, application programming interface (API) unit 2065, input unit 2070, output unit 2075, and inter-unit communication mechanism 2095 for the different units to communicate with each other, with the OS, and with other applications (not shown). The described units and elements can be varied in design, function, configuration, or implementation and are not limited to the descriptions provided. Processor(s) 2010 can be in the form of hardware processors such as central processing units (CPUs) or in a combination of hardware and software units.

In some example implementations, when information or an execution instruction is received by API unit 2065, it may be communicated to one or more other units (e.g., logic unit 2060, input unit 2070, output unit 2075). In some instances, logic unit 2060 may be configured to control the information flow among the units and direct the services provided by API unit 2065, the input unit 2070, the output unit 2075, in some example implementations described above. For example, the flow of one or more processes or implementations may be controlled by logic unit 2060 alone or in conjunction with API unit 2065. The input unit 2070 may be configured to obtain input for the calculations described in the example implementations, and the output unit 2075 may be configured to provide an output based on the calculations described in example implementations.

Processor(s) 2010 can be configured to execute a method or instructions which can involve detecting, from a device schedule indicating a schedule of a plurality of applications used by a plurality of mobile devices in a plurality of locations over a plurality of time slots, whether a bandwidth shortage will occur in each of the plurality of locations as shown at FIG. 10 and FIG. 11; and for a detection that a bandwidth shortage will occur at a location in the plurality of locations, calculating a priority for use of each of the plurality of applications on each of the plurality of devices at the location based on a bandwidth reduction efficiency and a staying time of the each of the plurality of devices at the location as shown at 908 of FIG. 10; and determining a bandwidth allocation for the each of the plurality of the applications across the each of the plurality of devices at the location and an edge server for managing one or more of the plurality of the applications based on the priority for use as shown at 910 of FIG. 10.

Processor(s) 2010 can be configured to execute the methods or instructions as described above, which can further involve calculating the bandwidth reduction efficiency of the each of the plurality of applications on the each of the plurality of devices at the location, the calculating the bandwidth reduction efficiency involving determining a difference between an input data rate for on-device and an output data rate of executing on the edge server for the each of the plurality of applications on the each of the plurality of devices at the location; wherein the priority for use is calculated based on weighing the difference between the input data rate and the output data rate for an application corresponding to the each of the plurality of devices, the weighing based on an acceptable bandwidth for the location as illustrated and described with respect to FIG. 4 and FIG. 5.

Processor(s) 2010 can be configured to execute any of the methods or instructions as described above, and further involve determining the staying time of the each of the plurality of devices at the location from the device schedule, the staying time based on a number of the plurality of time slots used by the each of the plurality of applications;

wherein the priority for use is calculated based on weighing the staying time as illustrated in FIG. 6.

Processor(s) 2010 can be configured to execute any of the methods or instructions as described above, and further involve reallocating one or more of the plurality of applications to one or more of the plurality of devices at the location or to the edge server based on the bandwidth allocation and the priority for use. In this manner, the management server can send the application to the device or the edge based on the priority calculated.

Processor(s) 2010 can be configured to execute any of the methods or instructions as described above, and further involve providing an interface configured to register the device schedule, the interface configured to intake a device selection from the plurality of devices, a time slot selection from the plurality of time slots, a location selection from the plurality of locations, and an application from the plurality of applications; and indicate conflicts from registration of the device schedule as illustrated in FIGS. 18 and 19.

Depending on the desired implementation, each of the plurality of devices is associated with an available number of on-device applications that can be executed on the each of the plurality of devices as illustrated in FIG. 9.

Processor(s) 2010 can be configured to execute any of the methods or instructions as described above, and further involve reallocating one or more of the plurality of applications to one or more of the plurality of devices at the location or to the edge server based on the available number of on-device applications for each of the one or more of the plurality of devices at the location as illustrated in FIG. 9.

Processor(s) 2010 can be configured to execute any of the methods or instructions as described above, wherein the calculating the priority for use is further based on the available number of on-device applications that can be executed on the each of the plurality of devices as illustrated in FIG. 12.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
detecting, from a device schedule indicating a schedule of a plurality of applications used by a plurality of mobile devices in a plurality of locations over a plurality of time slots, whether a bandwidth shortage will occur in each of the plurality of locations;
for a detection that a bandwidth shortage will occur at a location in the plurality of locations:
calculating a priority for use of each of the plurality of applications on each of the plurality of devices at the location based on a bandwidth reduction efficiency and a staying time of the each of the plurality of devices at the location; and
determining a bandwidth allocation for the each of the plurality of the applications across the each of the plurality of devices at the location and an edge server for managing one or more of the plurality of the applications based on the priority for use.

2. The method of claim 1, further comprising calculating the bandwidth reduction efficiency of the each of the plurality of applications on the each of the plurality of devices at the location, the calculating the bandwidth reduction efficiency comprising determining a difference between an input data rate for on-device and an output data rate of executing on the edge server for the each of the plurality of applications on the each of the plurality of devices at the location;

wherein the priority for use is calculated based on weighing the difference between the input data rate and the output data rate for an application corresponding to the each of the plurality of devices, the weighing based on an acceptable bandwidth for the location.

3. The method of claim 1, further comprising determining the staying time of the each of the plurality of devices at the location from the device schedule, the staying time based on a number of the plurality of time slots used by the each of the plurality of applications;

wherein the priority for use is calculated based on weighing the staying time.

4. The method of claim 1, further comprising reallocating one or more of the plurality of applications to one or more of the plurality of devices at the location or to the edge server based on the bandwidth allocation and the priority for use.

5. The method of claim 1, further comprising providing an interface configured to register the device schedule, the interface configured to:

intake a device selection from the plurality of devices, a time slot selection from the plurality of time slots, a location selection from the plurality of locations, and an application from the plurality of applications; and indicate conflicts from registration of the device schedule.

6. The method of claim 1, wherein each of the plurality of devices is associated with an available number of on-device applications that can be executed on the each of the plurality of devices:

wherein the method further comprises reallocating one or more of the plurality of applications to one or more of the plurality of devices at the location or to the edge server based on the available number of on-device applications for each of the one or more of the plurality of devices at the location.

7. The method of claim 1, wherein the calculating the priority for use is further based on an available number of on-device applications that can be executed on the each of the plurality of devices.

8. A non-transitory computer readable medium, storing instructions for executing a process, the instructions comprising:

detecting, from a device schedule indicating a schedule of a plurality of applications used by a plurality of mobile devices in a plurality of locations over a plurality of time slots, whether a bandwidth shortage will occur in each of the plurality of locations;

for a detection that a bandwidth shortage will occur at a location in the plurality of locations:

calculating a priority for use of each of the plurality of applications on each of the plurality of devices at the location based on a bandwidth reduction efficiency and a staying time of the each of the plurality of devices at the location; and determining a bandwidth allocation for the each of the plurality of the applications across the each of the plurality of devices at the location and an edge server for managing one or more of the plurality of the applications based on the priority for use.

9. The non-transitory computer readable medium of claim 8, the instructions further comprising calculating the bandwidth reduction efficiency of the each of the plurality of applications on the each of the plurality of devices at the location, the calculating the bandwidth reduction efficiency comprising determining a difference between an input data rate for on-device and an output data rate of executing on the edge server for the each of the plurality of applications on the each of the plurality of devices at the location;

wherein the priority for use is calculated based on weighing the difference between the input data rate and the output data rate for an application corresponding to the each of the plurality of devices, the weighing based on an acceptable bandwidth for the location.

10. The non-transitory computer readable medium of claim 8, the instructions further comprising determining the staying time of the each of the plurality of devices at the location from the device schedule, the staying time based on a number of the plurality of time slots used by the each of the plurality of applications;

wherein the priority for use is calculated based on weighing the staying time.

11. The non-transitory computer readable medium of claim 8, the instructions further comprising reallocating one or more of the plurality of applications to one or more of the plurality of devices at the location or to the edge server based on the bandwidth allocation and the priority for use.

12. The non-transitory computer readable medium of claim 8, the instructions further comprising providing an interface configured to register the device schedule, the interface configured to:

intake a device selection from the plurality of devices, a time slot selection from the plurality of time slots, a location selection from the plurality of locations, and an application from the plurality of applications; and indicate conflicts from registration of the device schedule.

13. The non-transitory computer readable medium of claim 8, wherein each of the plurality of devices is associated with an available number of on-device applications that can be executed on the each of the plurality of devices;

wherein the instructions further comprises reallocating one or more of the plurality of applications to one or more of the plurality of devices at the location or to the edge server based on the available number of on-device applications for each of the one or more of the plurality of devices at the location.

14. The non-transitory computer readable medium of claim 8, wherein the calculating the priority for use is further based on an available number of on-device applications that can be executed on the each of the plurality of devices.

15. An apparatus, comprising:

a processor, configured to:

detect, from a device schedule indicating a schedule of a plurality of applications used by a plurality of mobile devices in a plurality of locations over a plurality of time slots, whether a bandwidth shortage will occur in each of the plurality of locations;

for a detection that a bandwidth shortage will occur at a location in the plurality of locations:

calculate a priority for use of each of the plurality of applications on each of the plurality of devices at the location based on a bandwidth reduction efficiency and a staying time of the each of the plurality of devices at the location; and determine a bandwidth allocation for the each of the plurality of the applications across the each of the plurality of devices at the location and an edge server for managing one or more of the plurality of the applications based on the priority for use.

* * * * *